US012246241B2

(12) United States Patent
Trehan

(10) Patent No.: US 12,246,241 B2
(45) Date of Patent: Mar. 11, 2025

(54) METHOD AND SYSTEM OF CAPTURING AND COORDINATING PHYSICAL ACTIVITIES OF MULTIPLE USERS

(71) Applicant: Rajiv Trehan, Bangkok (TH)

(72) Inventor: Rajiv Trehan, Bangkok (TH)

(73) Assignee: Rajiv Trehan, Bangkik (TH)

( * ) Notice: Subject to any disclaimer, the term of this patent is extended or adjusted under 35 U.S.C. 154(b) by 392 days.

(21) Appl. No.: 17/721,395

(22) Filed: Apr. 15, 2022

(65) Prior Publication Data

US 2023/0071274 A1  Mar. 9, 2023

Related U.S. Application Data

(63) Continuation-in-part of application No. 17/467,374, filed on Sep. 6, 2021, now Pat. No. 12,131,731, and
(Continued)

(51) Int. Cl.
*A63B 71/06* (2006.01)
*A63B 24/00* (2006.01)
(Continued)

(52) U.S. Cl.
CPC ...... *A63B 71/0622* (2013.01); *A63B 24/0062* (2013.01); *A63B 71/0616* (2013.01); *G06F 3/16* (2013.01); *G06T 13/40* (2013.01); *G06T 13/80* (2013.01); *A63B 2024/0068* (2013.01); *A63B 2071/0625* (2013.01);
(Continued)

(58) Field of Classification Search
USPC ......... 434/247–261; 382/107–108, 115–123, 382/155–159; 706/1–62, 900–903
See application file for complete search history.

(56) References Cited

U.S. PATENT DOCUMENTS 11,967,149 B2 * 4/2024 Decrop ............. G06F 18/23213
2020/0104777 A1 * 4/2020 Bouhini ......... G06Q 10/063112
(Continued)

OTHER PUBLICATIONS

Putnam Brynn; A Reflective Video Display Apparatus for Interactive Training and Demonstration and Methods of Using Same; 2019 (Year: 2019).*

*Primary Examiner* — Marcellus J Augustin
(74) *Attorney, Agent, or Firm* — Kendal M. Sheets

(57) ABSTRACT

The present disclosure relates to system and method for coordinating and providing overall feedback for one or more users performing one or more physical activities at one or more locations. The feedback may be generated as AI feedback or human feedback. The method involves data capturing and coordinating the physical activities of the multiple users. The information to be captured is regarding performance activity of the multiple users and processing the same information in real time using AI assisted model. The method includes comparing each user's activity performance data including various performance parameters having a set of target activity performance parameters. The method includes generating feedbacks based on the comparison of the performance parameters. The feedbacks generated are shared with the users and rendered on the multimedia output device available to the users. The method includes sending the feedback to external portals via corresponding Application Programming Interfaces (APIs).

18 Claims, 24 Drawing Sheets

Related U.S. Application Data a continuation-in-part of application No. 17/467,381, filed on Sep. 6, 2021, and a continuation-in-part of application No. 17/467,386, filed on Sep. 6, 2021, now Pat. No. 11,996,090.

(51) Int. Cl.
*G06F 3/16* (2006.01)
*G06T 13/40* (2011.01)
*G06T 13/80* (2011.01)

(52) U.S. Cl.
CPC .............. *A63B 2071/0655* (2013.01); *A63B 2071/0694* (2013.01); *G06T 2200/24* (2013.01)

(56) References Cited

U.S. PATENT DOCUMENTS

| | | |
|---|---|---|
| 2021/0154529 A1* | 5/2021 | Barr ................... G06T 13/40 |
| 2021/0373676 A1* | 12/2021 | Jorasch ................ G06F 3/038 |
| 2021/0406738 A1* | 12/2021 | O'Donncha ........... G16H 20/30 |
| 2022/0203168 A1* | 6/2022 | Calderon ........... A63B 24/0062 |
| 2023/0050570 A1* | 2/2023 | Chen .................... G06T 13/80 |

* cited by examiner

METHOD AND SYSTEM OF CAPTURING AND COORDINATING PHYSICAL ACTIVITIES OF MULTIPLE USERS

CROSS-REFERENCE TO RELATED APPLICATION

This application claims the benefit of and is a continuation-in-part of co-pending U.S. application Ser. No. 17/467,374 filed on Sep. 6, 2021, U.S. application Ser. No. 17/467,381 filed on Sep. 6, 2021, and U.S. application Ser. No. 17/467,386 filed on Sep. 6, 2021, which are hereby expressly incorporated by reference in its entirety for all purposes.

TECHNICAL FIELD

The instant disclosure relates to system and method for monitoring and coordinating activity training, and more particularly to system and method for capturing and coordinating physical activities of multiple users.

BACKGROUND

Over the last couple of years, people have been increasingly aspiring to be healthy and have normal levels of fitness, while maintaining work and personal life balance. Moreover, desire to manage their own health has been increasing. As a result, exercising after work, while travelling, on weekends, or in free time, has been on the rise. There are a variety of physical activities (for example, strength training, dance, yoga, Pilates, martial arts, boxing, meditation, physical therapy and rehabilitation, CrossFit, Les Mills, F45, Zumba, Bikram Yoga, Orange Theory, or other types of workouts or exercises) that may be performed to improve quality of life with a little investment of time. Moreover, there are a lot of facilities and provisions that facilitate user's access to such variety of physical activities. Notwithstanding, mostly people do not want to travel and visit exercise facilities, gyms, physical rehabilitation centers, dojos, martial arts centers, dance studios as they do not have time and/or motivation. Many people may be shy, or may find it intimidating, or they may have religious reasons (baring skin), or they may be embarrassed because of their body shape. In addition, affordability is another reason, as some people may not be able to afford personal instructions provided by trained experts. Most recent times of pandemic has also made people worried about visiting such facilities because of potential virus and communicative illnesses. Physical disabilities may be another factor that may discourage people from travelling to and using such facilities.

As a result of the issues, many people have started exercising or performing other activities in the comfort of their home or room (for example, hotel room). Indoor performance of physical activities has been resonating with many people, since a person's schedule, weather, or other limiting factors as mentioned above can be easily circumvented. Accordingly, sale of indoor exercise apparatuses, such as, treadmills, stair exerciser apparatuses, steppers, exercise bikes, elastic bands, and other similar motion exerciser apparatuses has increased.

For best results of such physical activities and to reduce the chance of muscle damage and injuries, many such physical activities require a user to correctly perform complex actions entailed therein. Additionally, skilled adjustment of weights or force resistance may also be of importance. Thus, unless the user has an expert to analyze the pose and movements of the user, the user may perform one or more actions with improper pose and movements, thereby injuring himself. Moreover, in long run, performing such physical activities indoors may get mundane and boring, as trainers or peers are not present to motivate or encourage the user to keep performing. As a result, the user may get discouraged and may either become irregular or may completely stop performing any physical activity.

Thus, to keep the user motivated to perform better day by day and achieve their individual fitness goals, constant monitoring of user's performance is required while performing such physical activities in the comfort of their homes or at respective distributed locations. To constantly monitor user's performance, feedback needs to be provided to the user by any means, whereby the feedback may encourage the user to perform better or boost their morale to excel in performing the physical activity. Therefore, there is a need for methods and systems that assist users in performing physical activities under expert guidance and coordination, while being convenient and cost effective.

SUMMARY

In an embodiment, a method for capturing and coordinating physical activities of multiple users is disclosed. The method may capture, via a multimedia input device, at least one activity performed by a plurality of users. The method may further comprise a first set of users from the plurality of users performing the at least one activity in distributed locations and a second set of users from the plurality of users performing the at least one activity in said distributed locations. The method is configured to process in real-time, via at least one Artificial Intelligence (AI) model from a plurality of AI models, the captured activity for each of the plurality of users. The method may determine for each of the plurality of users a set of user performance parameters based on current activity performance. The AI model may be configured based on the target activity performance of an activity expert, and by a plurality of correct and/or incorrect movements, as well as the tolerance metrics associated with the current activity of the users. The tolerance metrics may vary for each individual user amongst the multiple users while performing the physical activity at a remote location alone or in a group of more than one user. The tolerance metrics may optionally be different for different users based on whether the user is a beginner, intermediary or an advanced level performer. Furthermore, each of the plurality of AI models are trained and configured for a given set of activities. The various activities may optionally be grouped into one or more circuits based upon the user's requirement, fitness plan or demand. The method may comprise comparing the set of user performance parameters with a set of target activity performance parameters obtained via at least one AI model for each of the plurality of users. The determination of set of target activity performance parameters is done based on inputs provided by a set of activity experts. The method may generate for each of the plurality of users, by the at least one AI model, a feedback based on the comparison of the set of user performance parameters with the set of target activity performance parameters. The feedback may comprise at least one of visual feedback, aural feedback, or haptic feedback. The method further comprising sharing the feedback with each of the plurality of users, by the at least one AI model. Further, the method comprising the step of sharing the feedback may further comprise rendering the feedback on a multimedia output device associated with the corresponding user and sending the feedback to the external portals via corresponding Application Programming Interfaces (APIs).

In another embodiment, system for capturing and coordinating physical activities of multiple users. The system may comprise a processor and a memory. The memory may communicatively be coupled to the processor. The memory is capable to store processor executable instructions, which when executed by the processor causes the processor to capture, via a multimedia input device, at least one activity performed by a plurality of users. The process may further comprise a first set of users from the plurality of users performing the at least one activity in distributed locations and a second set of users from the plurality of users performing the at least one activity in distributed locations. The processor is configured to process in real-time, via an Artificial Intelligence (AI) model from a plurality of AI models, the captured activity for each of the plurality of users. The processor may determine for each of the plurality of users a set of user performance parameters based on current activity performance. The AI model may be configured based on the target activity performance of an activity expert, and by a plurality of correct and/or incorrect movements, as well as the tolerance metrics associated with the current activity of the users. Furthermore, each of the plurality of AI models are trained and configured for a given set of activity. The processor may comprise comparing the set of user performance parameters with a set of target activity performance parameters obtained via at least one AI model for each of the plurality of users. The determination of set of target activity performance parameters is done based on inputs provided by a set of activity experts. The processor may generate for each of the plurality of users, by the at least one AI model, a feedback based on the comparison of the set of user performance parameters with the set of target activity performance parameters. The feedback may comprise at least one of visual feedback, aural feedback, or haptic feedback. The processor further comprising sharing the feedback with each of the plurality of users, by the at least one AI model. Further, the processor may comprise sharing the feedback by rendering the feedback on a multimedia output device associated with the corresponding user and sending the feedback to the external portals via corresponding Application Programming Interfaces (APIs).

In yet another embodiment, a computer program product being embodied in a non-transitory computer readable storage medium of a computing device is disclosed. The computer program product comprising computer instructions for capturing and coordinating physical activities of multiple users. The method comprising capturing, via a multimedia input device, at least one activity performed by a plurality of users. The method further comprising a first set of users from the plurality of users performing the at least one activity in distributed locations and a second set of users from the plurality of users performing the at least one activity in distributed locations. The method is configured to process in real-time, via an Artificial Intelligence (AI) model from a plurality of AI models, the captured activity for each of the plurality of users. The method may determine for each of the plurality of users a set of user performance parameters based on current activity performance. The AI model may be configured based on the target activity performance of an activity expert, and by a plurality of correct and/or incorrect movements, as well as the tolerance metrics associated with the current activity of the users. Furthermore, each of the plurality of AI models are trained and configured for a given set of activity. The method may comprise comparing the set of user performance parameters with a set of target activity performance parameters obtained via at least one AI model for each of the plurality of users. The determination of set of target activity performance parameters is done based on inputs provided by a set of activity experts. The method may generate for each of the plurality of users, by the at least one AI model, a feedback based on the comparison of the set of user performance parameters with the set of target activity performance parameters. The feedback may comprise at least one of visual feedback, aural feedback, or haptic feedback. The method further comprising sharing the feedback with each of the plurality of users, by the at least one AI model. Further, the method comprising the step of sharing the feedback may further comprise rendering the feedback on a multimedia output device associated with the corresponding user and sending the feedback to the external portals via corresponding Application Programming Interfaces (APIs).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explains the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
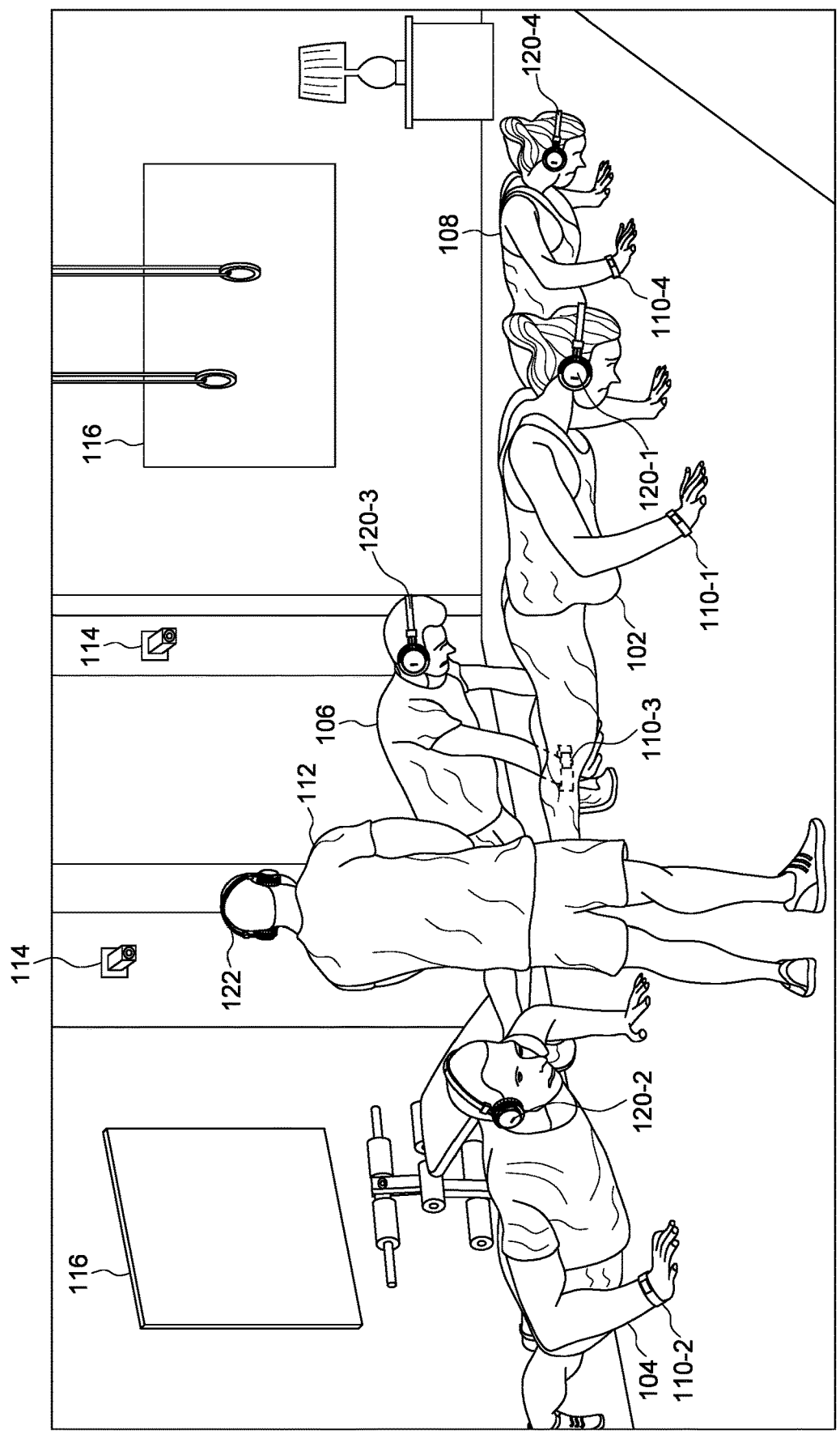
FIG. 1 illustrates an exemplary smart camera and display screen for providing an Artificial Intelligence (AI) assisted group activity training in a room, in accordance with some embodiments.

The present invention provides a system and method for monitoring the group workout activities of multiple users by the means of artificial intelligence (AI) assisted activity training. As shown in FIG. 1, one or more cameras 114 are provided for capturing performance-based real time information of multiple users shown as 102, 104, 106, and 108, respectively, and via AI assistance coordinating with each of the multiple users. The multiple users 102, 104, 106, and 108 performing a physical activity may undergo an AI assisted activity training within the comfort of their respective rooms or they may perform in a group workout session within same room. The AI assisted activity training may involve installing one or more cameras 114, at the workout locations which may be a personal room of the user or a common room for performing group workouts. The one or more cameras may be an infrared camera, motion detection cameras, or the like. The one or more cameras 114, may be the external cameras thereby enabling capturing more information about the multiple users 102, 104, 106, and 108 respectively, at a set particular time and in the user-friendly environment.

In accordance with some embodiments, one or more smart screens 116 or a display device may be provided in the same room where the multiple users or at least one of the users out of the multiple users 102, 104, 106, and 108 may be performing the physical activity either individually or in a group. The group workout activities may optionally be performed in a shared environment like gymnasiums (gyms). The one or more smart screens 116 may optionally be installed in the rooms, to provide either facial or geometric identification to the users for physical recognition of all the user present in the room or at least one of the users present in the room to perform the physical activity. It may so happen that at least one of the users may optionally be found walking around or roaming around the workout area and not practicing the physical activity. In such situations as soon as the users switch their respective locations, the face recognition tool enabled into the AI assisted activity training system which may optionally be self-activated to identify the users. In addition, the users activities around the workout area may optionally be tracked with respect to users location, device, or area. A display device 116 is configured to provide AI assisted activity training to the users. The display device 116 may also include the system that is configured to provide AI assisted activity training. The display device 116, for example, may be a smart TV, a mobile phone, a laptop, a tablet, or a smart projector with inbuilt camera. The display device 116 may include a display screen that may be used to present the user with the plurality of activity categories and subsequently one or more activities presented as multimedia content.

In accordance with some embodiments of FIG. 1, the multiple users 102, 104, 106, and 108, receive instructions via wearable headphones 120-1, 120-2, 120-3, and 120-4 respectively. The wearable headphones are a hearing aid through which the multiple users may receive remote feedbacks in the form of audio or aural instructions. The aural feedback may be generated in the form of an auditory signal, beep, sound of clap, and the like. The feedbacks may be provided to all the users via AI enabled wearable headphones. The user may optionally be provided with wearable headphones every time the user is performing the physical activity. The wearable headphones may optionally be provided with Bluetooth connectivity and may be connected to the user display device.

In addition to the wearable headphones as provided to all the multiple users, there may be provided a wearable band or a mat to each or at least one of the multiple users to coordinate their respective performances via AI. The wearable band 110-1, 110-2, 110-3, and 110-4 as shown in FIG. 1, are to be worn by each user on their respective wrist. The wearable wrist band 110 may also be connected via Bluetooth to one or more mobile device or the display device (not shown) where the users performance information is being captured and stored. Thus, users performance may be tracked and monitored from a remote location based on the information gathered via AI enabled devices including oner or more of wearable headphones, or a wrist band, or a smart watch, or a mat, etc. These performance tracking devices may optionally determine and provide indicative values for user's heart rate, body temperature, blood pressure, calorie burnt count, etc. The wearable device such as wrist band or smart watches may optionally provide audio or haptic feedbacks to the one or more of multiple users.

In reference to FIG. 1, the multiple users 102, 104, 106, and 108 respectively, may or may not perform a group activity at the same time or in same sequence. The physical activities performed by the users either in a group session or individually may be accessed and monitored via AI assisted activity training cameras 114, whereby the feedbacks may be provided either via visual mode by displaying the username as well as the activity being done on the screen 116 or via audio mode by sending voice messages through headphones 120 individually or collectively to all the users. However, the feedbacks to be provided to the users may also be given as haptic feedback by accessing sensory motions of at least one of the multiple users. The feedbacks to be rendered to the users may be specific feedback with respect to a particular user relating to any physical activity being performed by that user or the feedback may be a general instructional information to be given to the user or a group of multiple users performing together in a room or an open space.

In accordance with some embodiments, the feedbacks to be provided to the multiple users may optionally work on AI or it may involve human intervention whereby a human trainer 112 may optionally be present at the workout location where at least one or more users may be performing the one or more physical activities. The human trainer 112 may provide verbal or physical feedbacks to the users while performing the physical activity. The trainer 112 may also be provided with similar wearable headphones 122 with a mike (not shown) for providing the feedback to the users in a way of speaking through the mike. The feedback provided by the trainer 112 whether verbal or physical, may be in a form of an instruction regarding the posture correction of the user, or a recommendation to the user, or a motivational conversation with the user to continue the ongoing activity, or an information to be periodically provided to the user in a manner to apprise the user to attentively listen to the AI assisted feedback being played in respective headphones of the multiple users. Alternatively, if the users are in remote location, then users may not require the headphones, besides a wearable wrist band may still be required to monitor the heart rate or any other parameter of the users.

Figure 2:
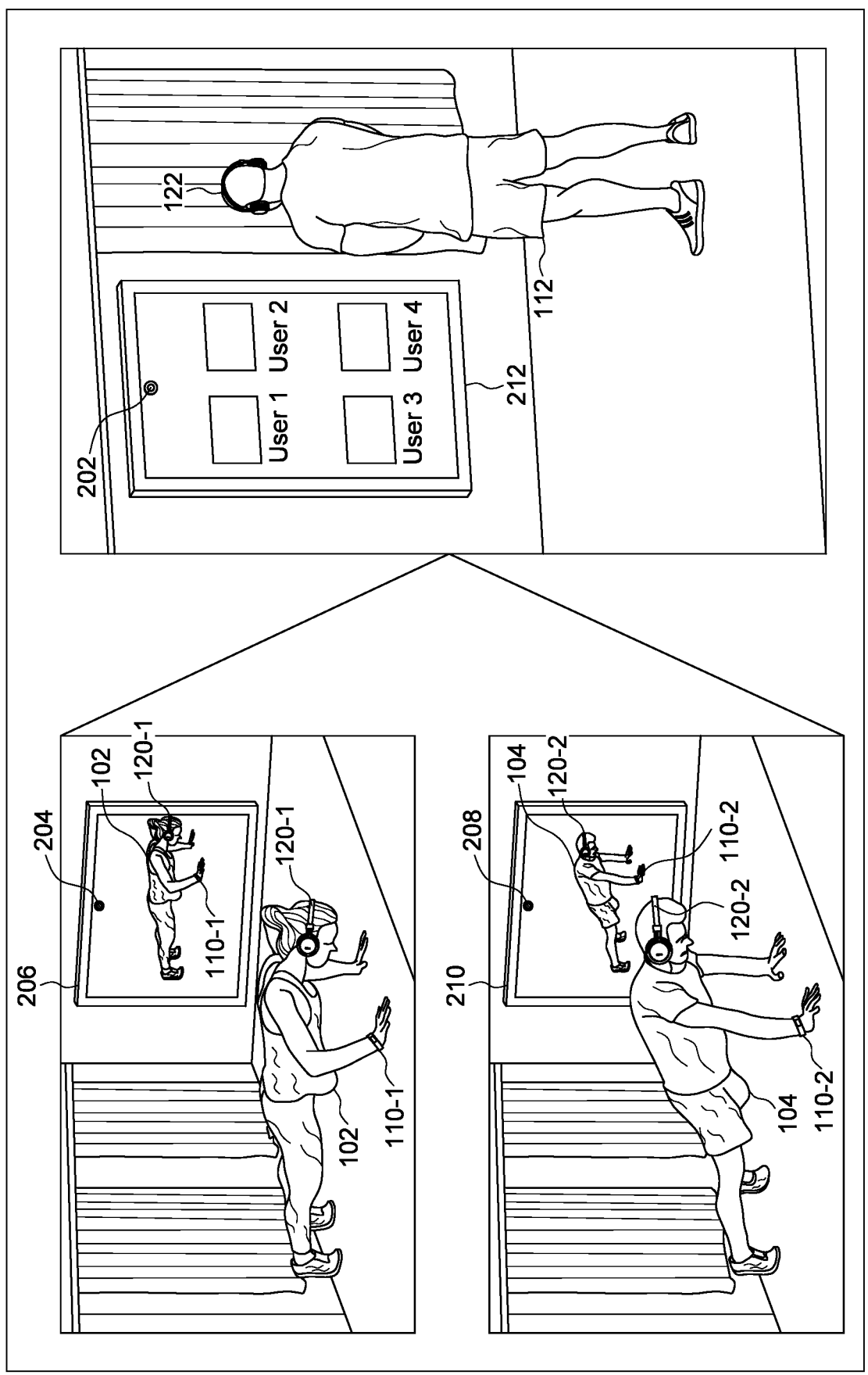
FIG. 2 illustrates an exemplary smart mirror for providing AI assisted activity training, in accordance with some embodiments.

In accordance with some other embodiments, in reference to FIG. 2, there may be provided at least one or more smart devices or a system having a smart mirror (a smart mirror 206 and a smart mirror 210, respectively), whereby the system may be configured to provide AI assisted activity training to the group of users or one or more individual users illustrated as 102, 104 in FIG. 2 respectively. The smart mirror may be seen attached to the smart device and the smart device may be installed in a common room, area, or a hall, where at least one or more users or the group of users may perform physical activities or workouts. For group workout sessions involving multiple users, one or more of such smart devices may be provided in a form of a display device, television (TV) screen, projectors, XR play, metaverse, and the like. The information displayed on any of these smart devices may be available to the user in the form of a visual data which may be a video recording, a video clip, live streaming, and the like. The information may also be in the form of an audible signals, audio instructions, and the like. Furthermore, the information may be in the form of a haptic information including sensory signals, indications, and the like. Alternatively, for users performing individual workouts at their respective locations, the personal information or performance data may be provided via any personal smart device, TV screen, metaverse, XR play, and the like. Alternatively, for individual users using a personal smart device (which may be AI enabled) some part of the system computing may be performed on edge, or some part of data computing may be performed via AI involving a cloud server. The system and various components within the system have been explained in detail in conjunction with FIG. 7. Once the user 102 activates or initiates the smart mirror 206, the user 102 may be presented with a plurality of activity categories. Each of the plurality of activity categories may further include a plurality of activities. The plurality of activity categories or activities may include, but are not limited to exercise, meditation, yoga, Pilates, martial arts, ikebana (flower arrangement), origami, painting, sculpting, pottery, physical rehabilitation, cooking, dancing, boxing, physical therapy and rehabilitation, CrossFit, Les Mills, F45, Zumba, Bikram Yoga, Orange Theory, or the like.

The plurality of activity categories and subsequently activities may be presented on a Graphical User Interface (GUI) of the smart mirror 206. The user 102 may select one or more of the plurality of activities, which may then be presented to the user via the GUI as a multimedia content. As depicted in FIG. 2, the user 102 may have selected pushups as the desired activity, which is then presented to the user via the GUI as a multimedia content. The user 102 may then follow or imitate the steps as instructed in the multimedia content to perform pushups.

In a manner, as a display device is provided in FIG. 1, instead of the display device 116, as depicted in FIG. 2, there are provided one or more smart mirrors 206 which may be provided with a hidden or partially hidden display or may be a one-way mirror having an integrated display screen. The one or more smart mirror 206 may have an external appearance of an actual mirror or a display device or a monitor having the AI assisted display integrated within. The one or more smart mirror 206 may have at least a partially covered semi-reflective coating. The semi-reflective coating may reflect an image of the multiple users 102 and/or 104, while simultaneously allowing display and viewing of videos or information presented via the display screen 116.

One of the differences between the smart mirrors 206 and 210, and the display device 116 may be that the smart mirror 206 may augment or overlay information over a reflection of the multiple users 102 and/or 104, while the display device 116 augments or overlays information over a video (live or recorded) of the user. Additionally, both the smart mirror 206 and the display device 116 may optionally perform similar functionalities in an analogous manner. The smart mirror 206 may include one or more cameras (a camera 204 and a camera 208 respectively), display screens, one or more processors (not shown), a memory (not shown), a microphone (not shown), one or more sensors (not shown), and a speaker (not shown). The one or more cameras, for example, may be infrared cameras, motion detection cameras, or the like.

In addition to the inbuilt cameras 204 and 208 in FIG. 2, external cameras (not shown) may also be provided that may be integrated with the smart mirror 206. Although, the external cameras may enable capturing more information about the multiple users and the user environment. Examples of one or more sensors may include but are not limited to Light Detection and Ranging (LiDAR), infrared sensor, motion sensor, proximity sensor, temperature sensors, or humidity sensors. The display screen of the smart mirror 206, 210 of FIG. 2, and/or the display device 116 of FIG. 1, for example, may include, but is not limited to a Liquid crystal display (LCD), a Light-emitting diode (LED) backlit LCD, a Thin-Film Transistor (TFT) LCD, an LED display, an Organic LED (OLED) display, an Active Matrix Organic LED (AMOLED) display, a Plasma Display Panel (PDP) display, a Quantum Dot LED (QLED) display, or a projector in case of gymnasium room or hall, or virtual 3D space like metaverse or XR play or the like.

The display screen of the smart mirror 206 and 210 and the display device 116 may optionally be operated or controlled by at least one of the multiple users 102 and 104, respectively, using a voice-based input. The voice-based input received from the user, via the microphone, may be processed by a Natural Language Processing (NLP) model configured within the smart mirrors 206 and 210. Examples of the NLP model may include but are not limited to Bidirectional Encoder Representations from Transformers (BERT), Robustly Optimized BERT Pretraining Approach (RoBERTa), ALBERT, XLNet, StructBERT, Unified Text-to-text Transformer (T5), TTS/STT model, GPT2, GPT3, ELECTRA, Decoding-enhanced BERT with Disentangled Attention (DeBERTa), and the like.

In an exemplary embodiment, the NLP model may further include an intent identification module which may identify an intent of the user based on the at least one first translated verbal input and the matched predefined interaction workflow via an NLP model. In an example, the NLP model may be trained and configured to identify intent of the user in the intermediate language. In another exemplary embodiment, the STT/TTS mechanisms using the NLP model may enable performing intent analysis on the received input from the user to determine intents of the user (for example, intonation, persuasion, arguing, facilitating, etc.). The STT/TTS mechanisms may enhance and strengthen intent analytics of the received verbal input and may generate feedback loops for enhancing accuracy related to use of vocabulary, grammar, functions, etc. Further, the NLP model may bypass a requirement for receiving an exact (for example, grammatically correct) input from the user and may control a degree of error to accept (e.g., grammatically incorrect) input dialogs in multiple languages. It may be noted that the NLP model may only be trained in one language, for example, English. Moreover, as the source language is always converted to the same intermediate language, thus the NLP model is only required to be trained and configured using the intermediate language.

The NLP model may process the voice-based inputs to extract user selection of one or more activities and the associated activity attributes. The NLP model may be configured using a single language and thus may also be called single language model. The single language, for example, may be English. Thus, when the user 102 provides a voice-based input in a source language (for example, Japanese), the NLP model first converts or translates the source language to an intermediate language that has been used to configure the NLP, which in this case is English. The NLP model may then process the voice-based input translated into the intermediate language, render the content as required or requested by the user, and may also render feedback (if required) to the user in the source language only. In other words, the smart mirrors 206 and 210 as depicted in FIG. 2, and the display device 116 as depicted in FIG. 1, are configurable, and may be used by any user, anywhere in the world, supported with the regional languages that the users may speak. Also, the NLP model may optionally work on elastic stretching approach which may ensure that no language-based learning is required by the smart mirrors or the display device before a user practically start using these devices.

Additionally, the NLP model may be configured to correctly understand the user intent based on the context in which certain words and phrases (that may sound phonetically similar) may be used. In other words, since the NLP model is configured based on context, it can clearly differentiate between utterance that may be potentially competing, based on the context in which they are used. By way of an example, the use of words "start" and "stop" for controlling a video based on voice commands is highly dependent on context. Moreover, since 'stop' and 'start' as single words may sound phonetically similar, understanding of the context or meaning by the NLP model to capture the correct intent is especially important. The NLP model in the invention derives context from various sources including but not limited to, site section, user mode, such as, editing or activity workout, current pose, target pose, and progress of an activity. Additionally, it may be noted that the context is configured within the single language model.

It may be noted that in addition to and in combination with the voice-based inputs, the smart mirror 206 and the display device 116 may also be operated or controlled using one or more of, but not limited to touch gestures, air gestures, face and eye gestures, biometric inputs, game controllers, inputs via keyboard, mouse or any other input devices such as personal smart devices including but not limited to smart phones, watches, or writing pads, tablets, etc.

Also, to initiate or start using the smart mirror 206 and the display device 116 various security mechanisms may be used to ensure that an unauthorized user is not able to access the smart mirror 206 and the display device 116. Examples of such security mechanisms may include, but are not limited to alphanumeric password, pattern-based passwords, voice recognition, biometric data (for example, retina scan, fingerprint, facial recognition, or heartbeat signature), One time Password (OTP), private key pairing, RFID tags, NFC tags, or proximity of a registered smart device.

The smart mirror 206 and the display device 116 may also connect and communicate with other computing devices (for example, a mobile phone, a laptop, a desktop, or a Personal Digital Assistants (PDA), and so forth), smart watches, fitness trackers, fitness bands, biometric sensors placed on a user, other smart mirror, and display devices over a communication network (for example, a cellular network, Wi-Fi Bluetooth, internet, or the like). The smart mirror 206 and/or the display device 116 may also be connected to AI server (not shown in FIGS. 1 and 2) over the communication network. In such case the AI server (which is the intelligence behind the smart mirror 206 and the display device 116) may be configured to provide AI assisted activity training and may reside in the main monitoring and control system. The AI may optionally be split on the edge and across multiple process. Thus, in some embodiments, one or more smart mirrors 206 and/or one or more display devices 116 may simultaneously present the same activity to respective users enabled by broadcasting the same recorded activity from the AI system. This feature may be helpful for group training session or group workouts which may be planned by multiple users. This is further explained in detail in subsequent paragraphs.

In an alternative embodiment, the AI system may broadcast a live training session which may alternatively be conducted by at least one human trainer to be provided to multiple smart mirrors 206 and/or multiple display devices 116 simultaneously. In context of description related to FIG. 1 and FIG. 2 and for ease of explanation, reference made to the smart mirror 206 hereinafter may also include the display device 116 and vice versa. It may further be noted that though numerous examples used to describe functionalities of the smart mirror 206 are related to different types of exercises, the invention is not limited to the same. Also, it will be apparent to a person skilled in the art that though examples have been depicted for a single user 102, a single smart mirror 206 or the single display device 116 may also be equipped to provide AI assisted activity training to the group of users performing the same activity at the same time or multiple smart mirrors or multiple display devices may be equipped for group workouts, or vice versa.

As discussed before, when the user initiates or activates the smart mirror 206 and 210 respectively, the smart mirrors 206 and 210 may present multiple activity categories as multimedia content. In an illustrative and non-limiting embodiment, the AI based training for multiple activity categories may include but are not limited to an 'all' activity category, an 'arms' activity category, a 'chest' activity category, a lunges' activity category, a legs' activity category, a 'shoulder' activity category, a 'squats' activity category, a 'torso' activity category, a 'triceps' activity category, and/or 'a yoga category'. Under the 'all' activity category, the presented multiple activities, for example, may include lateral squats, side lunges, side squats, side burpees, side push-ups, front overhead triceps, front push-ups, dumbbell squat press, front squats, and/or front lunges. Additionally, multiple activities included in each of the plurality of activity categories may also be presented on the GUI of the smart mirror 206 and 210, based on user selection of an activity category. The activity categories may optionally be combined in circuits or workout sessions.

Based on the presented multimedia content, the users 102 and 104 may select an activity or an activity training plan through a voice-based input in a source language. It may be noted that user input may also be received via touch gestures, air gestures, eye gestures, biometric inputs, game controllers, inputs via keyboard, mouse, or any other input device as may be used or available to the users. By way of an example, the activity training plan may include selection of lateral squat activity and side push-ups activity from the 'all' activity category, and one or more other activities from the 'squat' and the 'lunges' activity categories. Using the voice-based input, the users 102 and 104 may additionally select an activity attribute associated with each of the one or more selected activities. Activity attributes may include, but are not limited to one or more of sequence of execution of the one or more selected activities, the number of sets for performing each of the one or more selected activities, a count for each of the one or more selected activities in each of the sets, duration of performing each of the one or more selected activities, rest period between each of the sets, intensity of performing each of the one or more selected activities, difficulty level of performing each of the one or more selected activities, or pace of performing each of the one or more selected activities. With regards to difficulty level, the user 102 and 104, for example, may have an option to select between a beginner level or an advanced level.

Once the user 102 and 104 has selected the one or more activities and the one or more associated activity attributes, a multimedia content in accordance user selection may be presented to the user 102 via the GUI of the smart mirror 206. The multimedia content may include multiple guidance instructions for the one or more activities that may be performed by a virtual assistant. The virtual assistant, for example, may be an avatar (3D or 2D) or a representation of a trainer or an expert who performs multiple guidance instructions involved in each activity. The avatar may be represented in metaverse or as an extended reality (XR) play in which user's avatar may be being protected in real time. The guidance instructions may include certain instructions related to correct posture, pose, and/or pace of performing an activity. By way of an example, when the activity is front squats, the guidance instructions may include maintaining space between feet, bending position and angle of knees with respect to feet, and depth of the squat, placement of hands, correct orientation of a knee or thigh, and/or angle of inclination of the back.

In another embodiment as shown in FIG. 2, there may be provided an AI assisted user interface (UI) 212 to be visible to the human trainer 112 who is remotely present at a location different from the physical activity performance location of the users 102 and 104. The AI assisted UI may be provided with an inbuilt camera 202 for capturing performance related information or data of the users 102 and 104, respectively. The UI may be a multi-unit display device configured to display usernames, user statistics, or other user related details accordingly. The trainer 112 may have the easy accessibility of the UI board. The trainer 112 may access performance related or general information about the users via the UI board by interpreting the indications given or shown on the UI board 212. The different icons shown on the UI (as user 1, user 2, user 3, and user 4, respectively) may indicate different situations such as the user is not performing the activity as per the image being flashed on smart mirrors 206 and 210, or an indication is given to the trainer 112 by at least one user 102 or 104 or both the users 102 and 104. The indication may either be regarding any difficulty face by the user while performing the physical activity or any assistance required by the user to perform any physical activity. The small icons on the UI board may also indicate which user is performing well amongst the group of multiple users. Accordingly, the trainer 112 may act and provide feedbacks to the users 102 or 104 or to a group of multiple users via AI enabled headphones 122.

Once the user 102 and 104 initiates user activity performance, one or more cameras configured with the smart mirrors 206 and 210 may detect initiation of the user activity performance. The detected user activity performance may include performance of a series of steps of the activity by the user 102 and 104 in response to the presented guidance instructions. The one or more cameras (that may be placed at distributed locations) may also capture a video of the user activity performance. In an embodiment, during the user activity performance, the smart mirrors 206 and 210 may overlay a pose skeletal model corresponding to the user activity performance over a reflection of the user on the smart mirrors 206 and 210, while performing the activity. The smart mirrors may include but not limited to display devices such as mobile phones, tablets, TV screens, laptop screens, etc. This may provide the users 102 and 104 with real-time feedback as to the performance of the users 102 and 104 with regards to the given activity. The smart mirrors 206 and 210 may also overlay a pose of the user over a video stream of an instructor or over the guidance instructions of the virtual assistant performed during the training.

For providing the AI assisted activity training, the smart mirrors 206 and 210 may use an AI model to process the video of the user activity performance captured by the one or more cameras 204 and 208 to extract a set of user performance parameters. In general, the AI model may process the video to determine the posture, the pose, and the body movements of the users 102 and 104. In addition to the one or more cameras, motion and/or biometrics parameters of the users 102 and 104 may be determined using one or more sensors, which may be configured with the smart mirror 206 and 210 or may be worn by the users 102 and 104. Examples of the sensors configured with the smart mirror 100, may include LiDAR, infrared, motion sensors, proximity sensors, heart rate sensor, calorie sensor, or temperature sensors, etc. The AI model, in addition to processing the captured video, may also process data captured by one or more of these sensors. In some configurations, the one or more sensors may be part of various health monitoring devices (for example, fitness bands, smart watches, and other similar smart wearables) worn by the users 102 and 104.

The information captured by the one or more sensors may be used to determine various biometric parameters of the users 102 and 104 during the user activity performance. The biometric parameters may also be a part of the user performance parameters. The user performance parameters may also be received from smart weights or strength bars or any smart IOT based fitness devices to be used by at least one of the users 102 and 104. To this end, the smart mirrors 206 and 210 or display devices, may optionally be configured with appropriate programming and communication interfaces to couple with such external smart devices.

The user performance parameters may include, but are not limited to speed of a current activity performance, number of repetitions completed or failed or performed accurately, overall completion of an activity circuit, third-party smart device information, pulse/heart rate of the user 102, heart beat pattern of the user 102, blood pressure of the user 102, calories burnt by the user 102, Electrocardiogram (ECG) parameters, level of perspiration of the user 102, and motion of the user 102.

Once the set of user performance parameters have been extracted, the AI model may compare the set of user performance parameters with a set of target performance parameters. In a manner like set of user performance parameters, the set of target activity performance parameters may include, but are not limited to speed of the target activity performance, blood pressure, target number of repetitions, target pulse rate of the user, and target motion of the user. Upon observing a difference or deviation between the two set of parameters (i.e., user vs target), the AI model may generate feedback for the user.

In some configurations, the AI assistance may further include different AI models, each of which is configured to perform distinct functionalities. For example, one AI model may be configured for pose matching, while other AI model may be configured for key point (or skeletal point) recognition. In such case, the AI model configured for pose matching may reside on a remote server, while the AI model configured for key point recognition may reside on an edge device, for example, the smart mirrors 206 and 210. As a result of assigning such distinct functionalities to different AI models, the requirement of transferring heavy data (for example, video data) to the remote server may not be required. This distinction between AI model is also done for enhanced data security as well as privacy, as it is safer to perform pose recognition and matching at the remote server than an edge device (for example, the smart mirror 206) which is shared by multiple people.

Figure 3:
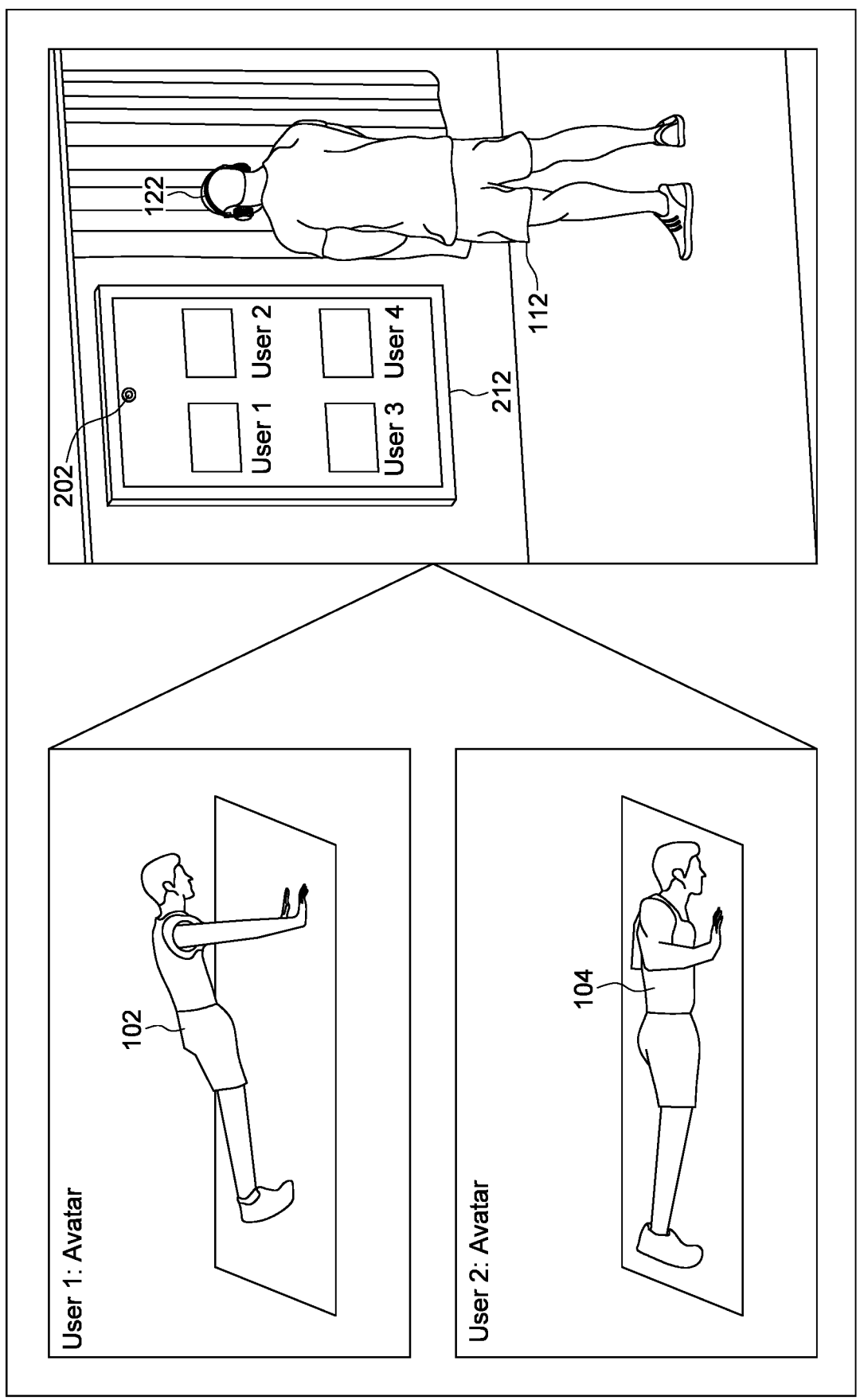
FIG. 3 illustrates providing AI assisted activity training from a remote location, in accordance with some embodiments.

In accordance with an exemplary embodiment, the users 102 and 104 as shown in FIG. 2, performing the physical activity may be a magnified image illustrating one or more usernames (user 1, user 2, user 3, and user 4 respectively) being displayed on the UI board. In an analogous manner as shown in FIG. 3, the trainer 112 via AI assistance may monitor the performance of the users 102 and 104 respectively, in accordance with some embodiments. The monitoring of users performance may be done by accessing the representation forms or by referring to graphical displays or of performance statistics, of various users 204 and 206 being displayed on the UI board 212. The trainer 112 may then provide required and relevant feedbacks to the users 102 and 104 (not shown) whose representations 204 and 206 (as shown) may be visible to the trainer 112. The user avatars 204 and 206 may be rendered on the UI board in the form of an exemplary image or a 3D model of the remotely located users (not shown) or the avatars may be a data representation, graphics display, or exemplary graphs.

In addition to the above disclosure, optionally the AI feedback for the multiple users may first be rendered to the trainer 112 and then the trainer 112 may convey or pass that feedback to the respective user or to all multiple users collectively. Although, as per a preferred embodiment, the feedback to be provided to the multiple users may preferably be provided via AI assisted activity training.

The feedback may be instantly provided in real-time or contemporaneous to the user 102 performing a given activity. To ensure that correct and timely feedback is generated and shared, a tight coupling of the user movement may be done with available performance guidance clues, target movements, media and voice and audio feedback. Additionally, or alternatively, the feedback may be provided after the user has completed the given activity. The feedback may include current performance statistics, previous performance data, or relative position of the users, but may not be limited to number of calories burnt, maximum count of an activity performed, maximum time spent on the activity during a previous activity session of the user 102, incorrect posture or pace of the user 102 while performing the activity, correct posture or pace to perform the activity, absolute activity performance proficiency of the user 102, relative activity performance proficiency of the user 102, best time taken to perform the activity, or warnings associated with biometric parameters of the user 102.

The feedback may then be rendered to the user 102 in any of an aural form, a visual form, or as haptic feedback. The visual form may include text in combination with various graphics displayed via the GUI. By way of an example, the feedback may correspond to adjusting the pose, movement pattern, and speed of performing the activity by the user 102 to match an expected pose, movement pattern, and speed that may correspond to an instructor's speed.

While aural or audio feedback may be audio instructions shared with the user 102 via the speakers of the display device 116 or smart mirrors 206 and 210 or smart headphones/earphones 120-1, 120-2, 120-3, and 120-4, respectively, to be used or put up by the multiple users 102, 104, 106, and 108 accordingly. The instructions may be related to a corrective action with regards to posture, pace, degree, tolerance, or movement pattern that may be taken by the user 102 to perform a given activity properly. By way of an example, instructions to the user 102 while the user is doing "pushups" may be "straighten your arms", "straighten your legs", "look down", "do not bend knees", and/or "hold the position for 10 seconds". By way of an example the instructions to the user while the user is doing "barbell curls" may be "adjust elbows to a lower position," "fix elbow position," "don't move elbow while curling," and/or "release barbell slowly." By way of another example, instructions to the multiple users while he is doing "front squats" may be "increase/decrease distance between feet," "keep knees at 90 degrees with respect to the floor," "lower the hips and bring to knee level" and/or "keep your core engaged."

The visual feedback may include the same instructions that are displayed to the user 102 via the GUI of the display device 116 or the smart mirrors 206 and 210. Thus, the visual feedback, for example, may include instructions in textual form that may be displayed on the smart mirrors 206 and 210 or on display device 116, along with various graphic elements. It may be noted that the graphic elements may include both static elements and dynamic elements that may include motion-based graphics. For example, directional indicators may be rendered on the GUI of the smart mirrors 206 and 210 may be used along with textual instructions to indicate to the user 102 that his elbows need to be lowered while performing barbell curls or the user 102 needs to keep his back upright while doing front squats. Additional graphic elements, such as, graphic indicators animations, highlights, or bright or dark regions, colored symbols may also be used to provide the feedback.

In some embodiment, the visual feedback may be in the form of skeletal pose model or skeletal points overlayed on the reflection of the user 102 in the smart mirror 100. In a preferred embodiment, for smartphones or tablet implementations the feedback generation may be replaced by augmentation or the video streaming or augmentation of an avatar. The skeletal points may be overlayed on corresponding joints of the user 102, for example, knees, hip joint, elbows, wrists, feet, and other joints. Whenever the user 102 is performing an activity using wrong pose or movement, one or more of these skeletal points may be activated or highlighted to indicate the same to the user 102 instantly. In case of the display device 116, the skeletal pose model or the skeletal points may be overlayed on a video stream captured for the user 102 while performing the activity. In some other embodiments, a multidimensional (3D or 2D) model of the user 102 or the virtual assistant may also be displayed via the GUI to provide feedback to the user.

In some cases, the multidimensional model may be overlayed on the reflection of the user 102 or the video of the user 102 while performing a given activity. The tight coupling discussed above plays a key role in ensuring that the skeletal pose model, skeletal points, or multidimensional avatars are correctly and timely overlayed. With regards to visual feedback, the feedback may also be provided as additional video clips, as inserted video clips incorporated into the instructor's video that includes an instructor providing specific feedback, and instructions for the user 102. The system may map and synchronize multimedia content and information as provided with actual movement of the user 102 and may thus provide relevant corresponding feedback.

With regards to the haptic feedback, the users 102 may have haptic devices or interfaces placed on specific body parts (joints or muscles) of the user 102 or may be the mats on which user may be performing the activity, or any workout equipment being used by the user while performing the activity. The haptic feedback may be used to provide an experience of touch by applying forces, vibrations, or motions to the user 102. In this case, the feedback may be generated in the form of specific vibrations or application of forces to specific body parts of the user to indicate that the user 102 is not performing the activity properly. For example, for a wrong elbow or knee position, haptic devices placed on these body parts may be activated to generate a vibration or force. In some embodiments, specific vibration patterns may be predefined to indicate whether the issue is with motion, pose, or movement pattern. In some other embodiments, one type of vibration (longer duration) may indicate incorrect performance, while other type of vibration (short duration in bursts) may indicate correct performance.

A sequence of haptic feedbacks may also be used to instruct or guide the user 102 to gradually correct his posture, pace, and/or movement pattern.

As may be appreciated, the feedback based on the activity being performed by the user 102 may not be limited to instructions to perform corrective actions. The feedback may also include biometric feedback or warnings, for example, any irregularity or issues in one or more of pulse rate or heartbeat of the user 102, body temperature of the user 102, spasms in muscles, pupil dilation, and other similar health issues.

In some embodiments, feedback may be in the form of motivation or encouragement provided to the user 102 while performing the activity or after completion of the activity. By way of an example, in the form of aural or audio feedback, messages like: "great job," "you are awesome," "great going," "perfectly done," "done like a pro," "you are the best," "that's the best I have seen", "new personal best", "5 reps in a row", "personal goal achieved", "1000 reps completed", "target achieved", "mission accomplished", or other similar messages, may be provided to the user 102. The aural feedback may be in the form of clapping sound, cheers, loud applaud, or various exclamations may also be provided to the user 102 as feedback. These messages may also be provided in the form of visual feedback, such that, the messages may be displayed in textual form on the GUI of the smart mirror 100. Additionally, or alternatively, graphic elements, for example, bursting crackers, flying balloons, sound of stadium crowd, or avatars of cheer leader, instructor, famous people (for example, Kai Greene, Phil Health, Ronnie Coleman, Arnold, or other know personalities), may also be displayed to the user 102. In some configurations, gamification of the activities performed by the user and/or a rewarding mechanism may be used for providing feedbacks to the users. As a result of such feedbacks, users may constantly feel motivated, or some user may not feel motivated seeing other users performing well. As an alternative, a part of the feedback may be shared with other users.

Figure 4A:
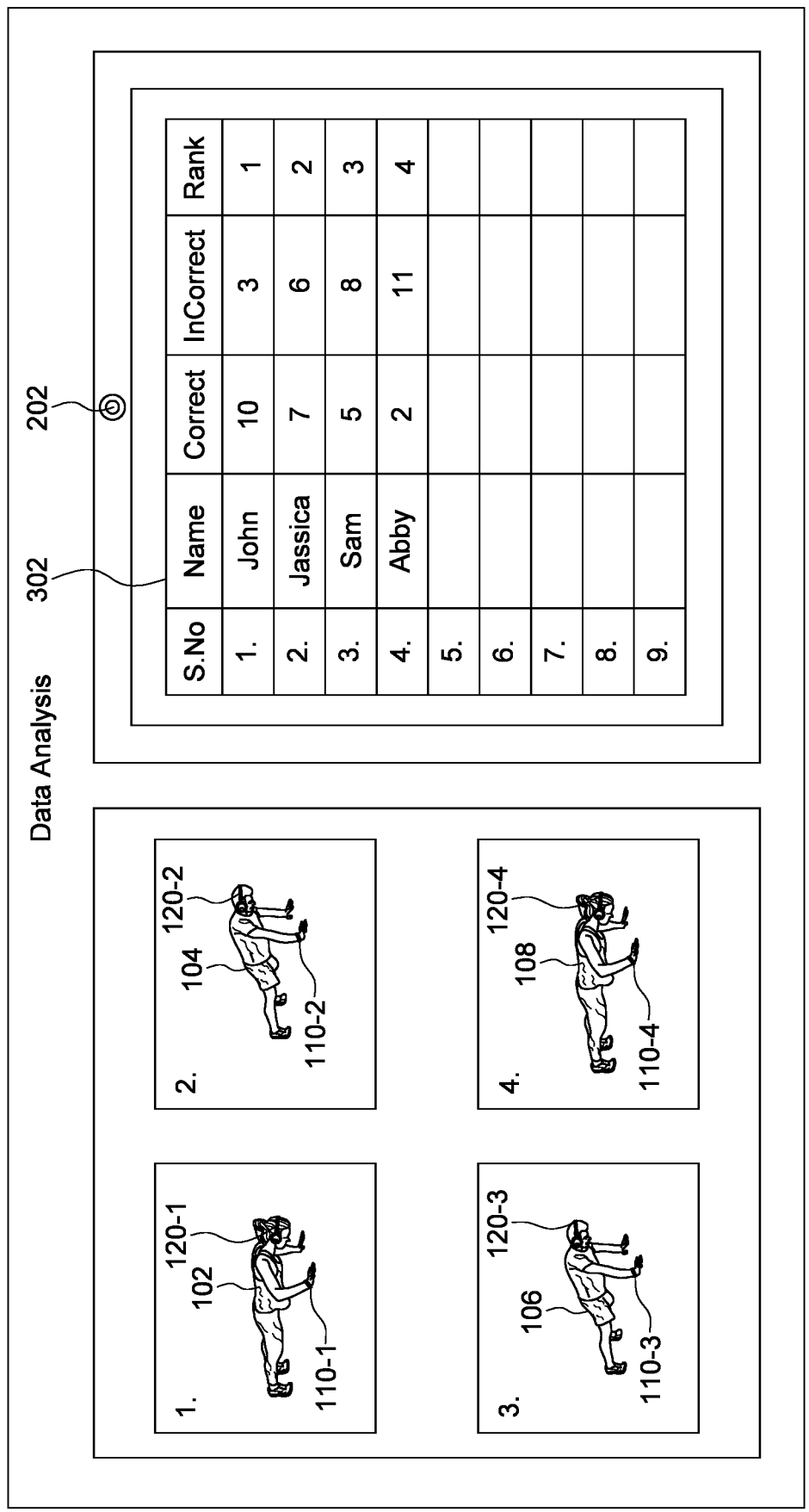
FIGS. 4A and 4B illustrates an exemplary leader board depicting performance rankings of users, in accordance with some embodiments.

Referring to FIG. 4A, depicting data on leader board 302 captured via AI assisted activity training, is illustrated in accordance with some embodiments. The leader board 302 depicts statistical data and information about multiple users (102, 104, 106, and 108, shown respectively) who are performing the physical activity. The leader board 302 displays performance-based information about the multiple users which may be the correct or incorrect number of times the multiple users performed an activity. The leader board 302 also highlight the rankings of multiple users whether 1, 2, 3, or 4, and so on amongst the whole group. Furthermore, the leader board 302 displays the basic information about the multiple users such as the usernames, age, or other vitals of the multiple users, etc. Thus, in a way the leader board 302 shows the analysis of users personal as well as performance data. The leader board 302 information may be changed or altered based upon the user criteria or preference to see any specific information.

Figure 4B:
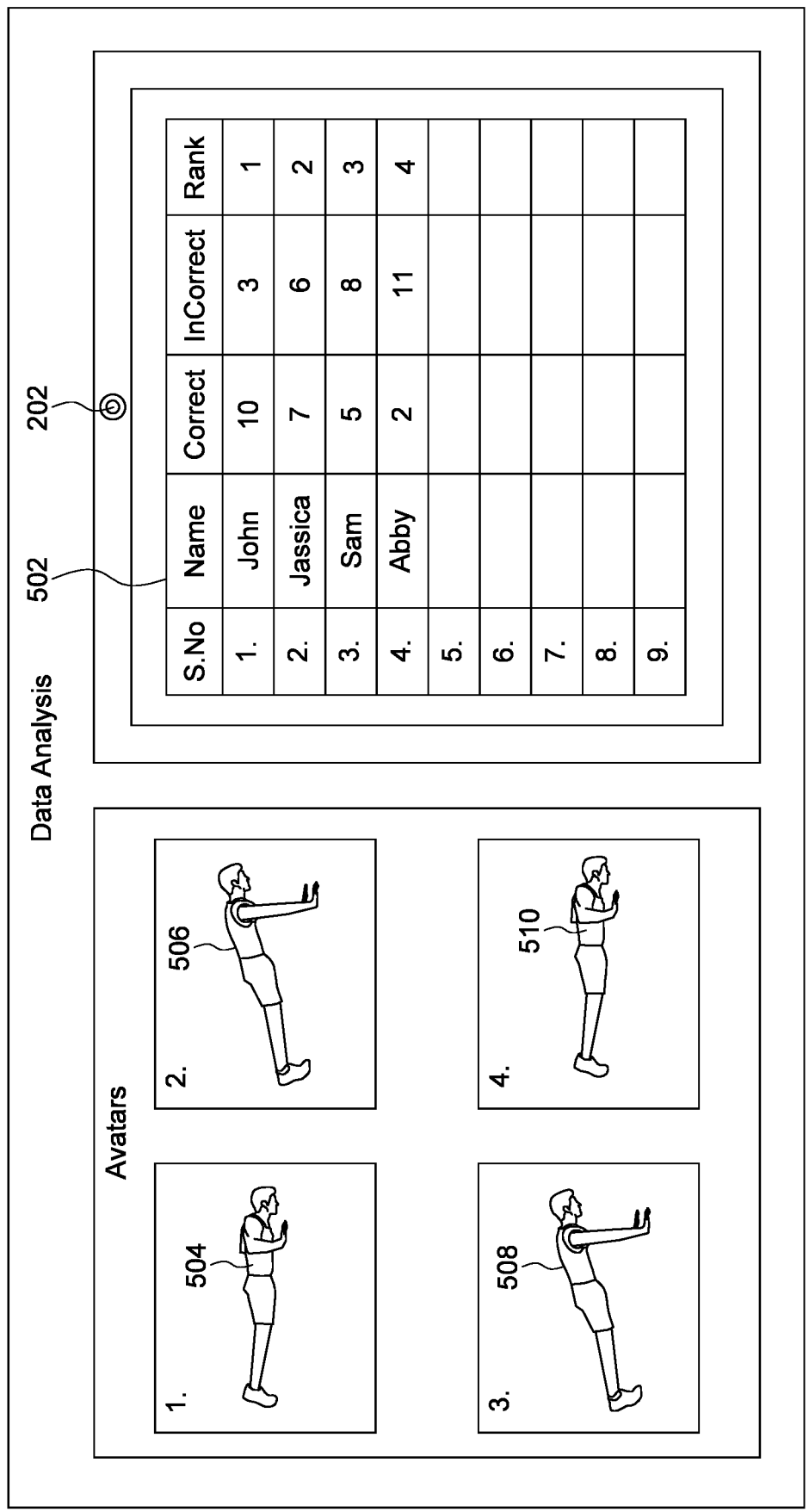

In a further embodiment, the leader board may be accessible to all the multiple users performing the physical activity as a group workout class whereby the information displayed on the leader board may also be accessible to the trainer who may or may not be located at a remote location. Thus, the leader board 302 may act as a user interface (UI). Furthermore, the information being populated on the leader board 302 may be a representation of the information captured via cameras 204 and 208 deployed on smart mirrors or display devices. Also, the multiple users (102, 104, 106, and 108) may be seen performing respective physical activities along with the leader board as instructed by AI driven wearable headphones (120-1, 120-2, 120-3, and 120-4, respectively) or the trainer itself (not shown). The feedbacks to be provided to the users may include one or more aural feedbacks which may be provided based on the leader board 302 performance or haptic feedbacks which may be provided to the users by the means of wearable wrist bands (110-1, 110-2, 110-3, and 110-4) to be worn by the multiple users (102, 104, 106, and 108 respectively), or wearable headphones, or user mats, etc. Alternatively, the feedback may be in a form of an expert's image or user avatar (504, 506, 508, and 510) which may be displayed on the leader board 302, as illustrated in FIG. 4B.

Figure 5:
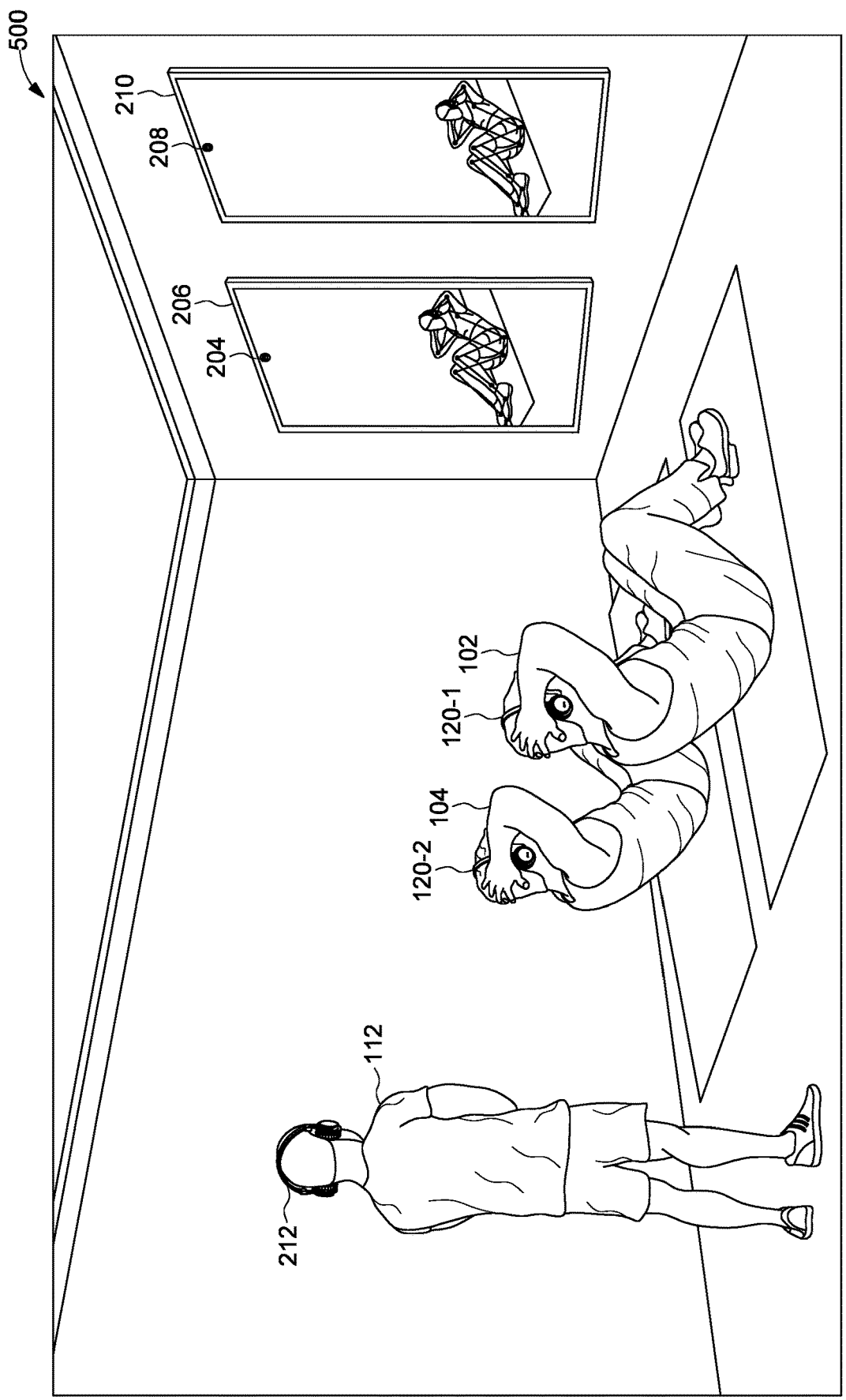
FIG. 5 illustrates multiple users performing activity in a room using smart mirrors for providing AI assisted activity training, in accordance with some embodiments.

In accordance with some embodiments, as shown in FIG. 5, providing the AI assisted activity training in a room 500 is illustrated. As illustrated, multiple users (for example, users 102 and 104) may be present in the room 500 and each of the multiple users may be performing similar or different activities. As depicted, the room 500 may have multiple smart mirrors 206 and 210 for performing multiple activities by the users. The room 500 may have multiple cameras 204 and 208 installed as an inbuilt camera on the smart mirrors 206 and 210, that are communicatively coupled to an AI system which includes a system which is configured to provide AI assisted activity training to the users. The overall system is the same as mentioned in FIGS. 1 and 2 that powers the smart mirrors (206 and 210) or the display devices 116. The system is further explained in detail in conjunction with FIG. 7.

The AI assisted server may either be located within a room 500 or may be remotely located. In some embodiments, the smart mirrors 206 and 210 and/or the display device 116 may not be used. In such embodiments, the users may have headphones that may automatically connect with AI as soon as the user comes in vicinity of AI server. Alternatively, or additionally, a human trainer 112 may or may not be physically present in the room 500 where the users are performing the physical activity. Additionally, the cameras 204 and 208 may identify and recognize each of the user using facial recognition techniques. The users, is some scenarios, may have a mobile application installed on their mobile devices, such that, the mobile application may relate to AI server. In this case, the moment a user enters the room 500 and open the mobile application, the user's presence in the room 500 is identified.

Irrespective of the methodology used to connect with the AI server within the gymnasium 300, the cameras 302 may capture activity of the users, which may then be processed by the system installed with the AI server. Accordingly, the system may provide relevant instructions and feedback to the users for improving the activities being performed by the means of AI enabled wearable headphones 120-1 and 120-2 worn by the users 102 and 104, respectively. The feedbacks may again be provided as per the feedback rendering techniques disclosed earlier in conjunction with FIG. 1 and FIG. 2. This has already been discussed in detail in conjunction with FIG. 1 and FIG. 2. It may be noted that the cameras 204 and 208 may also track and record the activity of the users in the room 500 as the users moves from one position to another and perform different activities.

Figure 6:
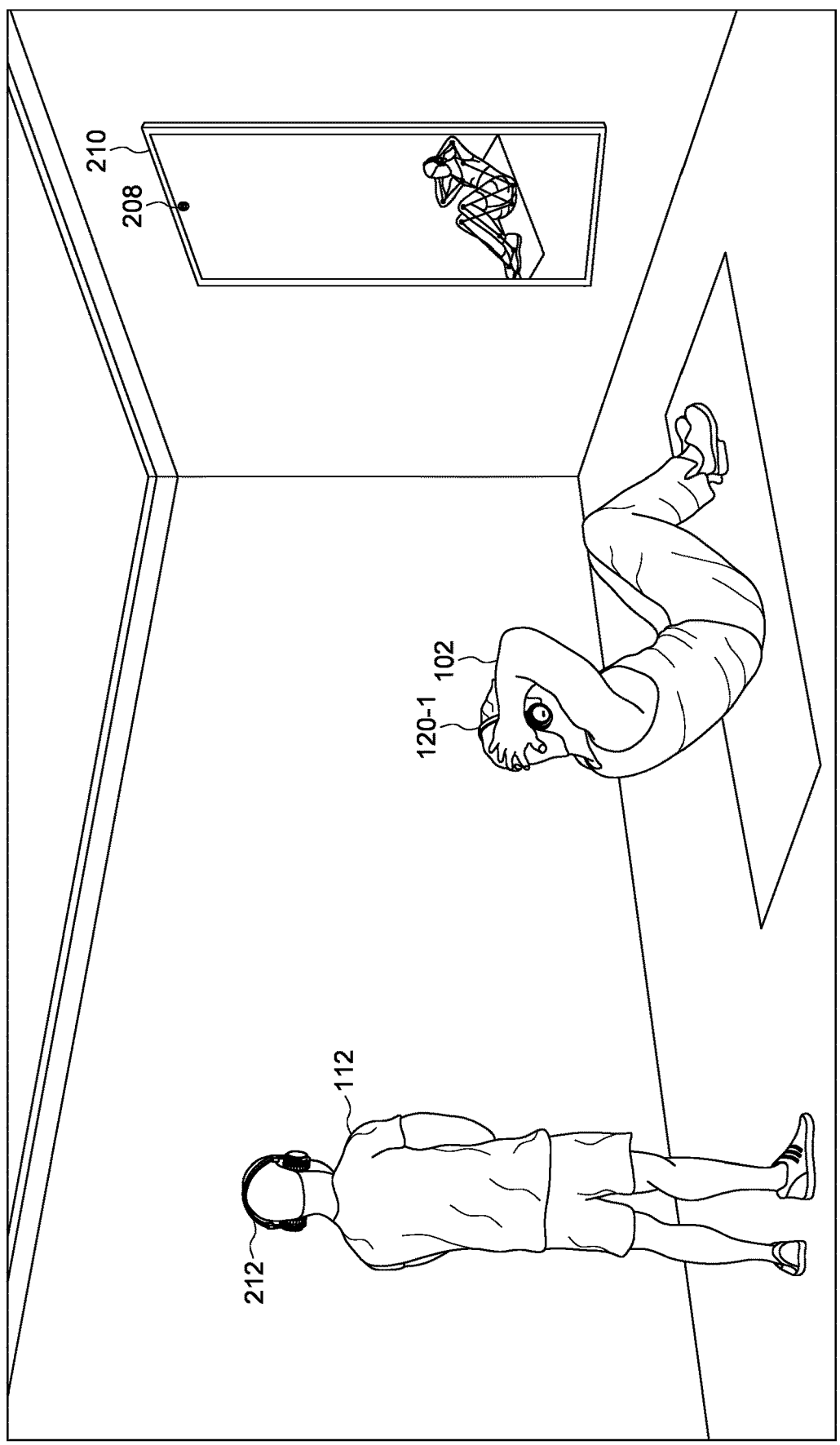
FIG. 6 illustrates a user performing activity using smart mirrors for providing feedback based on AI model, in accordance with some embodiments.

In accordance with FIGS. 5 and 6, it may happen that user 102 may either perform the same physical activity as the other user 104 or the user 102 may perform different activities other than physical activity been performed by 104. The cameras 204 and 208 may allow continuity of the user's context and information across various areas within the room 500. In this configuration for the smart mirrors 206 and 210, there may be provided one contiguous smart mirror 206 or 210 of a generous size and there may be multiple display areas behind the contiguous smart mirror. Thus, multiple users may be able to use the single smart mirror 206 or 210 at the same time. Thus, in such embodiments, the users can may alternatively perform workouts within the room 500 without availing services of personal trainer 112, and still get continuous feedback as to improvements and corrective action to be performed for any given activity.

In an alternative embodiment, as illustrated in FIG. 6, the multiple users 102 and 104 may either be physically present in the same room 500 to perform the physical activity in front of the physical trainer 112 and the smart mirrors 206 and 210 or any one of the users 102 or 104 may be virtually located at a different location as compared to the location of another user to perform the given physical activity. In this case the coordination may or may not be established amongst the users 102 and 104 while performing the physical activity. Alternatively, the users 102 and 104 may perform different physical activities at the same time and their performance may be seen on the smart mirrors 206 and 210 in real time with the help of AI. It may also be possible that the performance of user 102 who is physically present in the room 500 is being monitored by the trainer 112 and the performance of the user 104 who is remotely located but connected via AI may be monitored through wearable AI enabled headphones or vice versa.

As mentioned before, instead of having a virtual assistant provide instructions and guidance for performing various activities, a real trainer or instructor may provide instructions and guidance. The instructor, for example, may be personal coaches, trainers, gym instructors, physical therapist, occupational therapist, physical education teachers, martial arts teachers, dance and choreography teachers, sports personalities, team coach, demonstrators and other trainers in health and fitness. In case such instructions are provided live, the real trainer or instructor may be located at a place where his/her video is recorded and broadcasted live to multiple smart mirrors 206, or display devices, tablets, TV screens, laptops, monitors, and the like, at the same time. As is the case with the virtual assistant, in case of the live broadcast as well, the instructions for performing the activity and respective feedback generated may be displayed on the smart mirror 206. Further, similar instructions and feedback may also be generated by the instructor for other users using a different smart mirror 206 or display device 116. In some embodiment, a user using the smart mirror 206 may share instructions and the feedback received from the instructor with one or more users present at remote locations, who are using their respective devices.

Figure 7:
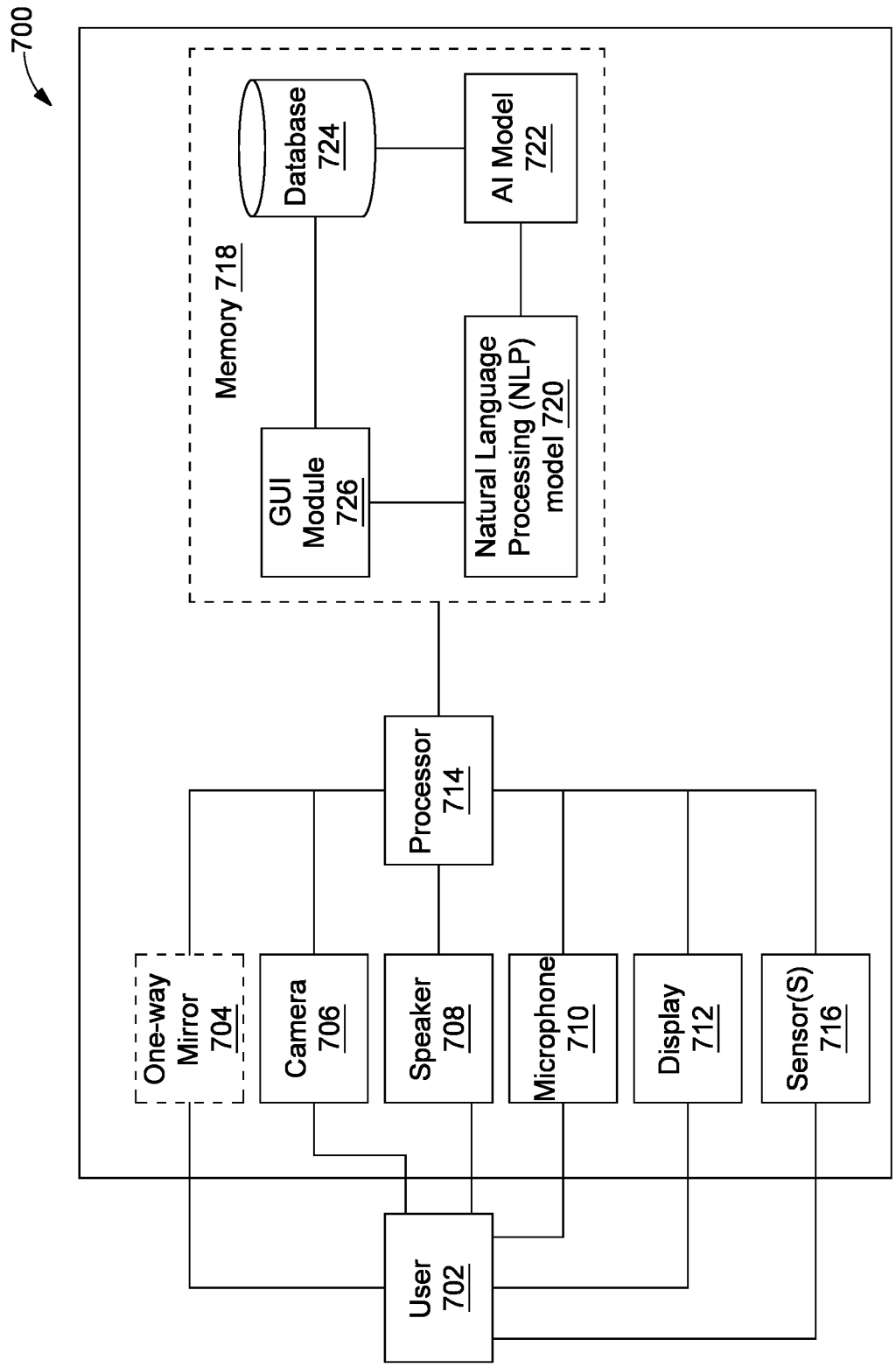
FIG. 7 illustrates a functional block diagram of an exemplary system for providing AI assisted activity training, in accordance with some embodiments.

Referring now to FIG. 7, a functional block diagram of a system 700 for providing AI assisted activity training to a user 702 is illustrated, in accordance with some embodiments. The system 700 may optionally or alternatively include a one-way mirror 704, a camera 706, a speaker 708, a microphone 710, a display 712, a processor 714, one or more sensors 716, and a memory 718. The memory 718 further includes a Graphical User Interface (GUI) module 726, a Natural Language Processing (NLP) model 720, an AI model 722, and a database 724. As will be appreciated, the system 700 may not include the one-way mirror 704, when the system 700 is supporting or powering display devices 116.

In configurations for the smart mirror 206 and 210, the display 712 may be coupled with the one-way mirror 704, such that, the one-way mirror 704 may cover the display

712. Further, the one-way mirror 704 may be configured to partially reflect an image of the user 702 and partially show the display 712 to the user 702. Therefore, the one-way mirror 704 may act as a semi-reflective surface for the user 702 and may act as a semi-transparent surface for the display 712. The display 712 may be of same dimensions as the one-way mirror 704. In an embodiment, the one-way mirror 704 may be of a size of a dressing table mirror, a full-length mirror, or the size of a television, or the size of the wall in case of a gymnasium having more than one display device being deployed on the wall. As discussed before, in configurations for the display device 116, the display 712 may be directly viewable by the user 702.

The GUI module 726 may be accessible to the users 702 via the display 712. The GUI module 726 may provide a plurality of activity categories to the user 102 or multiple users 102, 104, 106 and 108. By way of an example, the plurality of activity categories may include, but may not be limited to exercise, meditation, yoga, Pilates, martial arts, ikebana (flower arrangement), origami, painting, sculpting, pottery, cooking, dance, boxing, physical therapy and rehabilitation, CrossFit, Les Mills, F45, Zumba, Bikram Yoga, Orange Theory, or the like. Each of the plurality activity categories may further include a plurality of activities. To select an activity category from the plurality of activity categories and subsequently one or more activities from the plurality of activities associated with the activity category, the user 702 may provide voice-based inputs via the microphone 710. Alternatively, or additionally, the user 702 may provide inputs via a touch gesture, an air gesture, an eye gesture, a biometric data input, or a signal generated by an input device (for example, a mouse, a touch pad, a stylus, a keyboard, or the like).

The voice-based input (or any other form of user input) may further include an activity attribute that is associated with each of the one or more activities. It may be note that the user 702 may generate the voice-based input in a source language. On receiving the voice-based input in the source language, the NLP model 720 may process the received voice-based input to extract the selection of the one or more activities and the one or more associated activity attributes. Examples of the NLP model 720 are mentioned in above paragraphs. The NLP model 720 may be configured using a single language. The single language, for example, may be English. Thus, when the user 702 provides a voice-based input in a source language (for example, Japanese), the NLP model 720 first converts or translates the source language to an intermediate language that has been used to configure the NLP, which in this case is English. The NLP model 720 may then process the voice-based input translated into the intermediate language, render the content as required or requested by the user 702, and may also render feedback (if required) to the user 702 in the source language only.

Based on the voice-input (or any other form of user input for that matter) received from the user 702, the display 712 may initiate presentation of a multimedia content. The presented multimedia content may be in conformance with the one or more activities and the one or more associated activity attributes. The multimedia content may include a plurality of guidance instructions to be performed by a virtual assistant corresponding to the one or more activities. This has already been explained in detail in conjunction with FIGS. 1 and 2. Upon initiation of presentation of the multimedia content, the camera 706 may detect in real-time, initiation of user activity performance of the user 702 and may subsequently capture a video of the user activity performance.

The AI model 722, in real-time, may then process the captured video to extract a set of user performance parameters of the user 102 based on the user activity performance. Further, the AI model 722 may generate a feedback based on differential between the set of user performance parameters and a target set of performance parameters. The feedback may then be rendered to the user in one or more of an aural form, a visual form, or as haptic feedback. The feedback may include, but is not limited to amount of calories burnt, maximum count of the at least one activity performed, maximum time spent for the at least one activity during a previous activity session of the user, incorrect posture or pace of the user while performing the at least one activity, correct posture or pace to perform the at least one activity, absolute activity performance proficiency of the user, relative activity performance proficiency of the user, best time taken to perform the at least one activity, or warnings associated with biometric parameters of the user. The feedback may also include content related to user encouragement and motivation. It may be noted that aural feedback may be provided to the users 702 by the means of speakers 708 or any audio device, and the visual feedback may be provided 702 by any display device 712 or video clips. Lastly, the feedback may also be provided in a haptic form to the users via sensorial touch, which may be rendered on user's personal device, or in a 3D space. This has already been explained in detail in conjunction with FIGS. 1 and 2

To generate exhaustive feedback, the user activity performance may also be measured by the sensors 716, which may be placed on the user 702. The sensors 716 may also be a part of various health or fitness monitoring devices that are worn by the user 702. The sensors 716, for example, may include, but are not limited to 3 axis accelerometer, gyroscope, motion sensor, pedometer, temperature sensor, pulse sensor, proximity sensors, or SPO2. This has already been explained in detail in conjunction with FIGS. 1-3.

It should be noted that all such modules 704-724 may be represented as a single module or a combination of different modules. Further, as will be appreciated by those skilled in the art, each of the modules 704-724 may reside, in whole or in parts, on one device or multiple devices in communication with each other. In some embodiments, each of the modules 704-724 may be implemented as dedicated hardware circuit comprising custom application-specific integrated circuit (ASIC) or gate arrays, off-the-shelf semiconductors such as logic chips, transistors, or other discrete components. Each of the modules 704-724 may also be implemented in a programmable hardware device such as a field programmable gate array (FPGA), programmable array logic, programmable logic device, and so forth. Alternatively, each of the modules 704-724 may be implemented in software for execution by several types of processors (e.g., processor 714).

An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in distinct locations which, when joined logically together, include the module, and achieve the stated purpose of the module. Indeed, a module of executable code could be a single instruction, or several instructions, and may even be distributed over several different code segments, among different applications, and across several memory devices.

Figure 8:
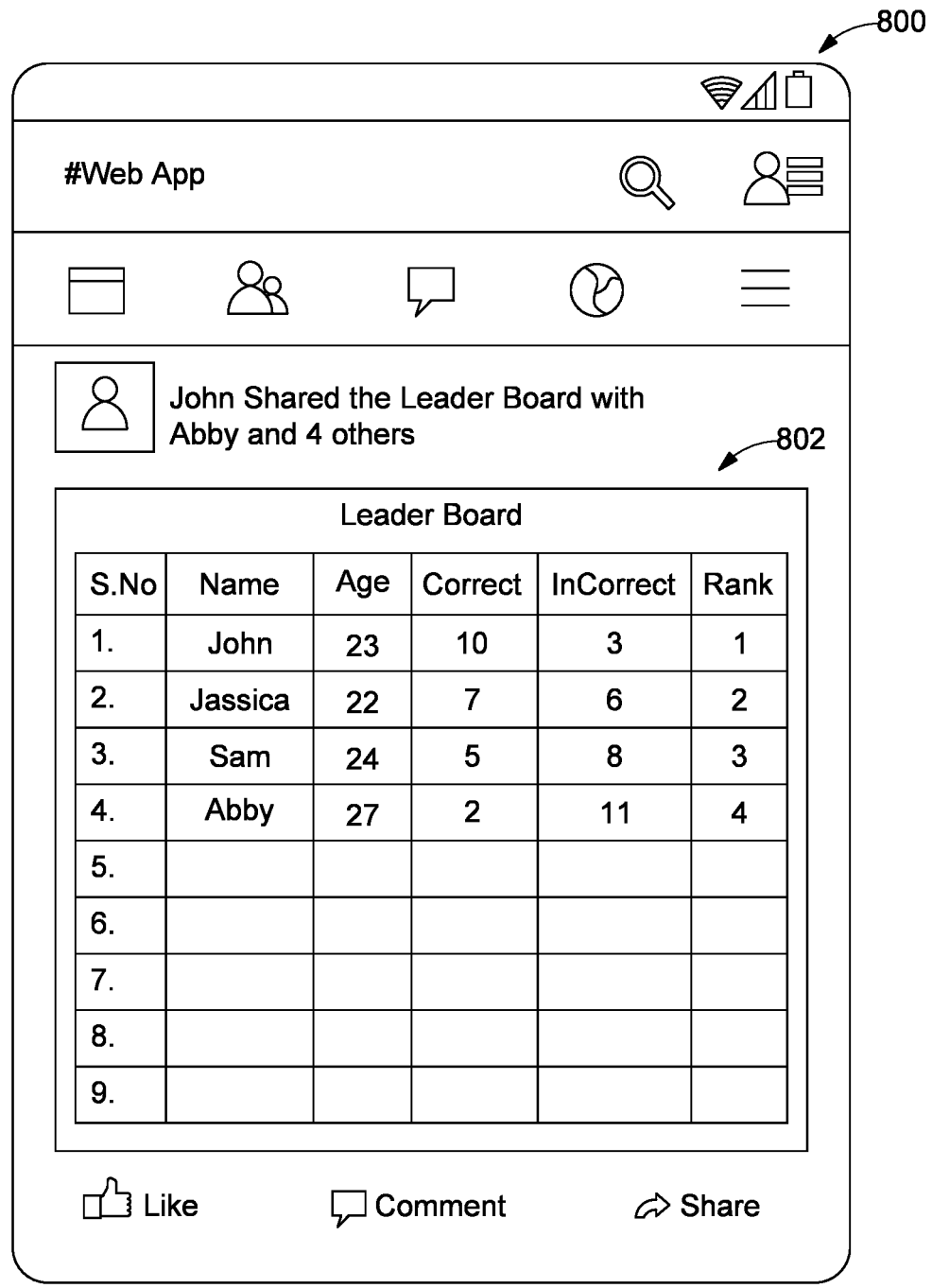
FIG. 8 illustrates a Graphical User Interface (GUI) depicting the comparative leader board displaying competitive performance statistics of multiple users, in accordance with some exemplary embodiments

Referring now to FIG. 8, a webapp landing page 800 is illustrated, in accordance with an exemplary embodiment. The webapp may be any user app or an online content which may be accessible in real time and may optionally include any webpage, a smart device, a tablet, a screen display, a television screen, or a monitor, and the like. With respect to FIG. 8, a summary of information about the multiple users (102, 104, 106, and 108) may be provided on the webpage. The information may be displayed via leaderboard 802 whereby the basic information regarding users may be accessible. The information may include the names of various users, appropriate age of the users, the performance-based statistics of the multiple users, the correct or incorrect number of times the physical activity has been performed by the multiple users, or the comparative rankings of the multiple users amongst the group. The data for the leader board 802 information may be gathered via AI. The leader board 802 information may be accessible to all the users using the webapp or via API and the information may also be accessible to the trainer 112.

The information displayed on the leader board 802 may be seen on display screens 116 in the room where the multiple users are performing the activities, or it may be accessible through any handheld mobile device used by the users on which the application has been installed. The ranking information 802 may be based on the current performance of the user on current date or it may be the historical performance or based on user's past performances, been performed either over a long duration or in multiple sessions in a one or more days. Also, the rankings may be based on the number of repetitions done by the users 102, or the number of correct or incorrect postures made by the user 102 or based on users accuracy of performing the activities. This was by accessing the ranking and other information from the leader board the competitive spirit of various users may be kept at high. The user 102 may also feel motivated to perform better and achieve excellence in their day-to-day activity performance by comparing their respective performance with respect to other users performances.

The ranking information as displayed on the leader board in 802 may change based on user's improvements in their performances. Thus, rankings are not fixed. The user rankings may also change based on how many users are there in a group. For example, a user of one group may be performing low but the overall group may be performing high, so the group's rank may be 2 whereas user's rank may be 4. In addition, the rankings may be based on the MERLIN effort points as rendered to each of the multiple users while performing the activity. The MERLIN effort points may include combining the performance parameters, exercising data, user configurations, and/or information available from external data sources such as a heart rate monitor.

Further, if a user wants to share their own performance information with the other users in the group or the group of users desire to share their group performance information with another fellow group, then the leader board information may be shared via social networking websites, webapp, TV display, live studio streaming, multimedia display, and the like. By way of example, if the user 102 may want to share activity performance with his friends on various social networks or with other remote users that may also use smart mirrors (206 and 210, respectively). To this end, the smart mirrors may be configured with various integrate with social media applications. Examples of these social media applications may include, but are not limited to FACEBOOK™ WHATSAPP™, YOUTUBE™, and/or INSTAGRAM™. In some embodiments, the smart mirrors may have these social media applications already installed therein. There may also be a social media application that is specific to the smart devices, and which may be configured to only connect users of other smart devices and/or display device.

Thus, by way of integration with these social media applications, the user performance may be posted and published on one or more of these social media platforms and may be made available as online content for other users to access. In some configurations, scores related to user activities may be presented on a leader board as points, for example as MERLIN points or EFFORT points, etc., for various users who use smart mirrors and/or display devices. Alternatively, the MERLIN points as scored or gathered by the users may optionally be used to purchase, buy, or exchange any goods or materials which may optionally be available for the users. Badges or medals may also be assigned to various users based on their level, frequency, quantity, quality, or improvements in performing the activities and may be displayed on social media platforms. Additionally, records related to exercises performed may also be displayed. The EFFORT points or MERLIN points may be calculated based on the various parameters like users body mass, body metrics, body size, percentage accuracy of performing the activities, the speed and frequency with which the users are performing the activities, the heart rate of the users, the total calories burnt by the users while performing the activities, etc.

Figure 9:
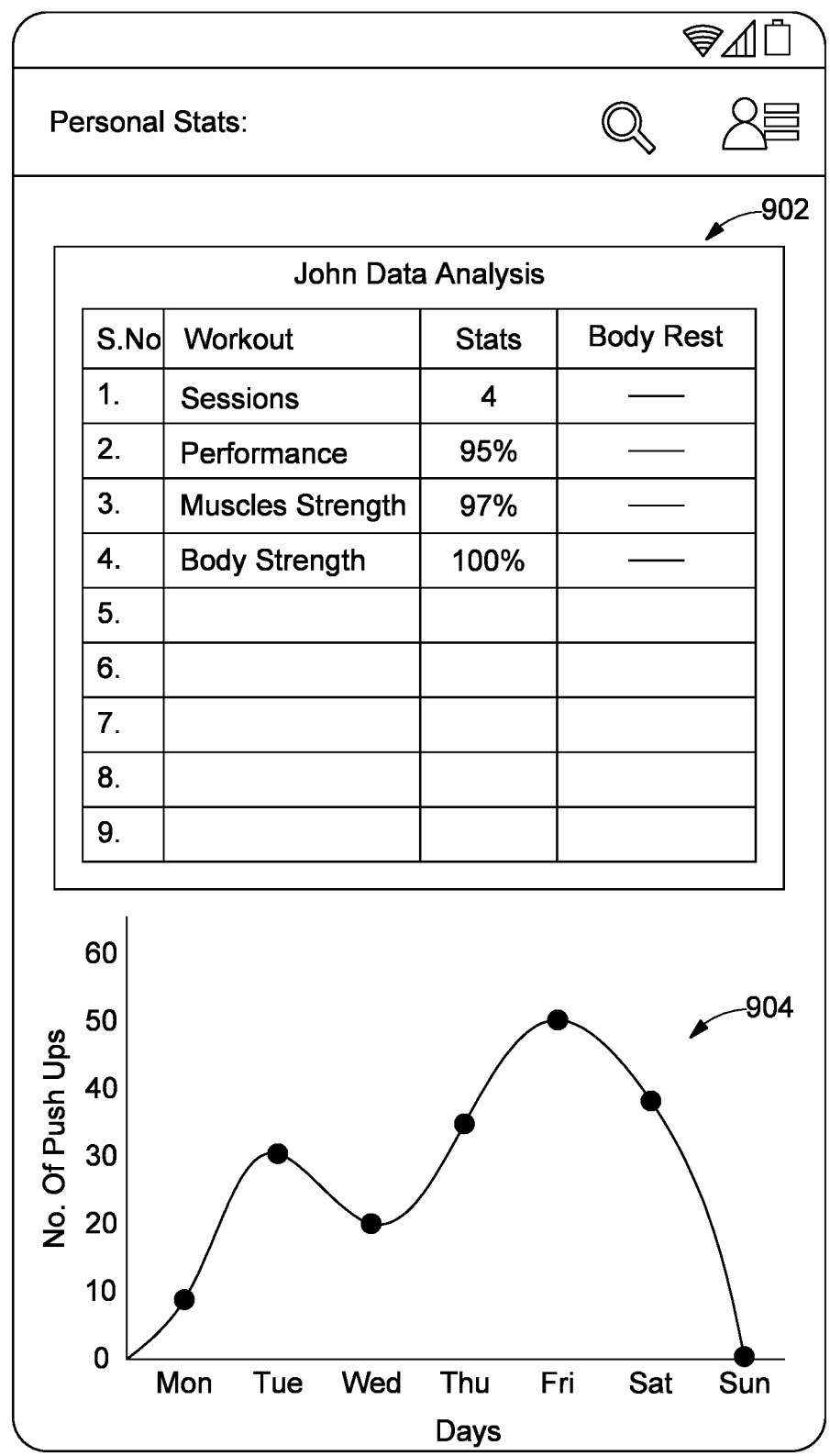
FIG. 9 illustrates a GUI depicting personal statistics of a user while performing physical activities, in accordance with some exemplary embodiments.

Now in context to FIG. 9, there is provided a GUI representation of the webapp whereby individual user's statistics may be accessed, as illustrated, in accordance with the exemplary embodiments. Whenever user 102 want to know about their own performance statistics and metrics then the user may be able to do so by accessing the personal stats as shown in FIG. 9. So, the personal historical data analysis may be visible whereby the user may want to look at how many sessions has been attended in a month per calendar year, or what was the accuracy of the user while performing during the sessions, or how much muscle strength has been built up by the user, or the body strength and mass strength improvement of the user. Further, the personal statistics may also provide knowledge on improvements in respective physical activities being performed by the user daily. Alternatively, the historical data may optionally include some long-term goals for the users for example performing more than thousands or may be 10,000 push-ups. Additionally, the long-term goals may be decided to be completed over a month or a year for individual user. Further, of an example, the user may alternatively want to know the number of pushups made by the user per week with respect to each day's performance improvements. Alternatively, tracking a week's performance may be a short-term goal for the user.

Figure 10:
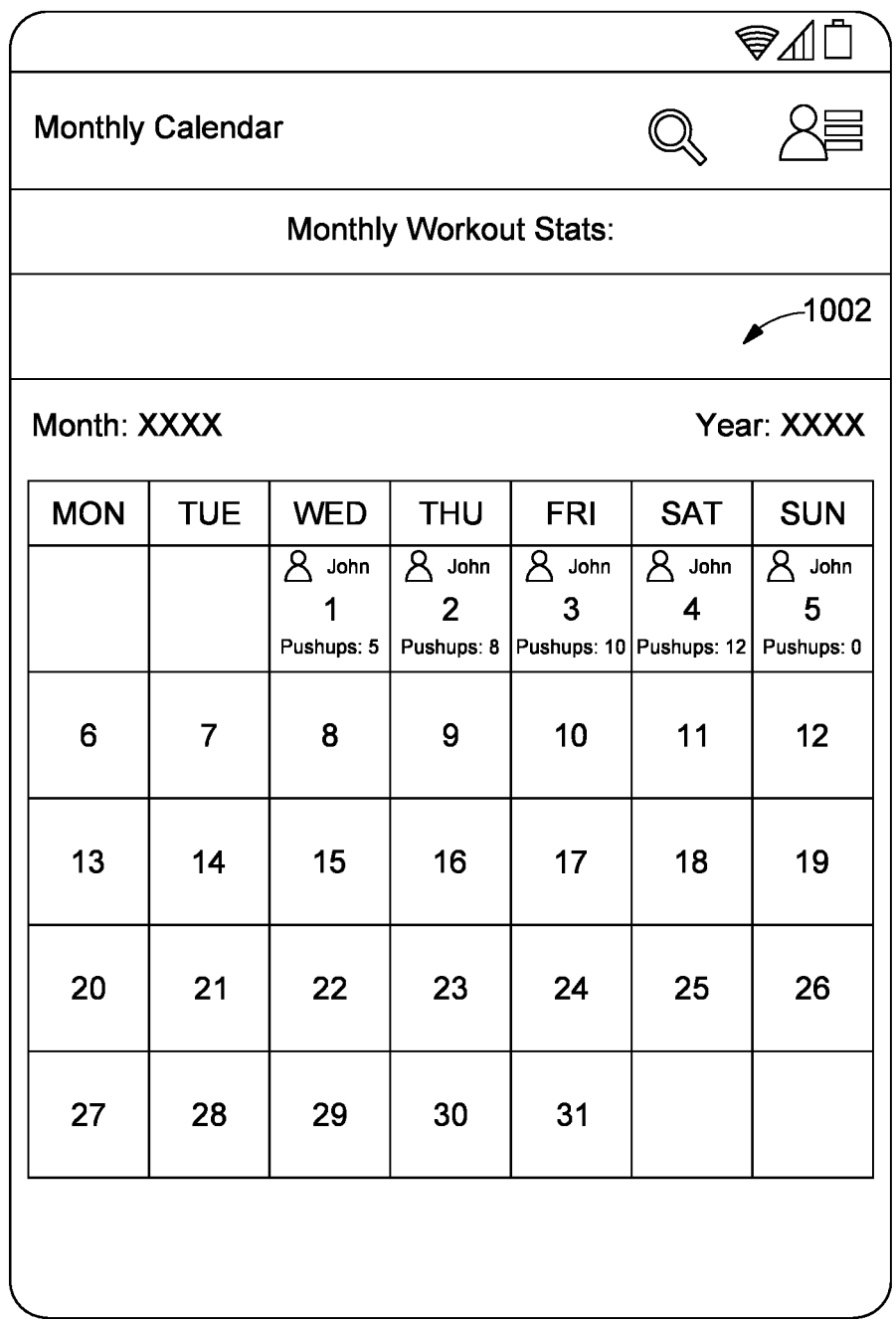
FIG. 10 illustrates a GUI depicting workout statistics of users in a calendar month, in accordance with some exemplary embodiments.

In accordance with some exemplary embodiments, as illustrated in FIG. 10, there is shown a GUI representation of a workout calendar 1002 of a user or a group of users to access information about users performance and improvements made over a month in a calendar year. The calendar information may or may not be shared with other users in the group who are performing the group workout activities together. So, any user may access the workout calendar to know about their own performance over the month or the user may want to know about the best performer of the month and their performance statistics accordingly. Thus, by accessing the workout calendar 1002 information, the users may get to know about which user performed which activity on which date/day and was termed as the star performer of that day or on that date. So, the GUI is very user friendly in terms of data accessibility and the user information available. By the means of GUI, the users may optionally belong to multiple groups and have access to views of their position regarding that group and the group challenges.

Figure 11:
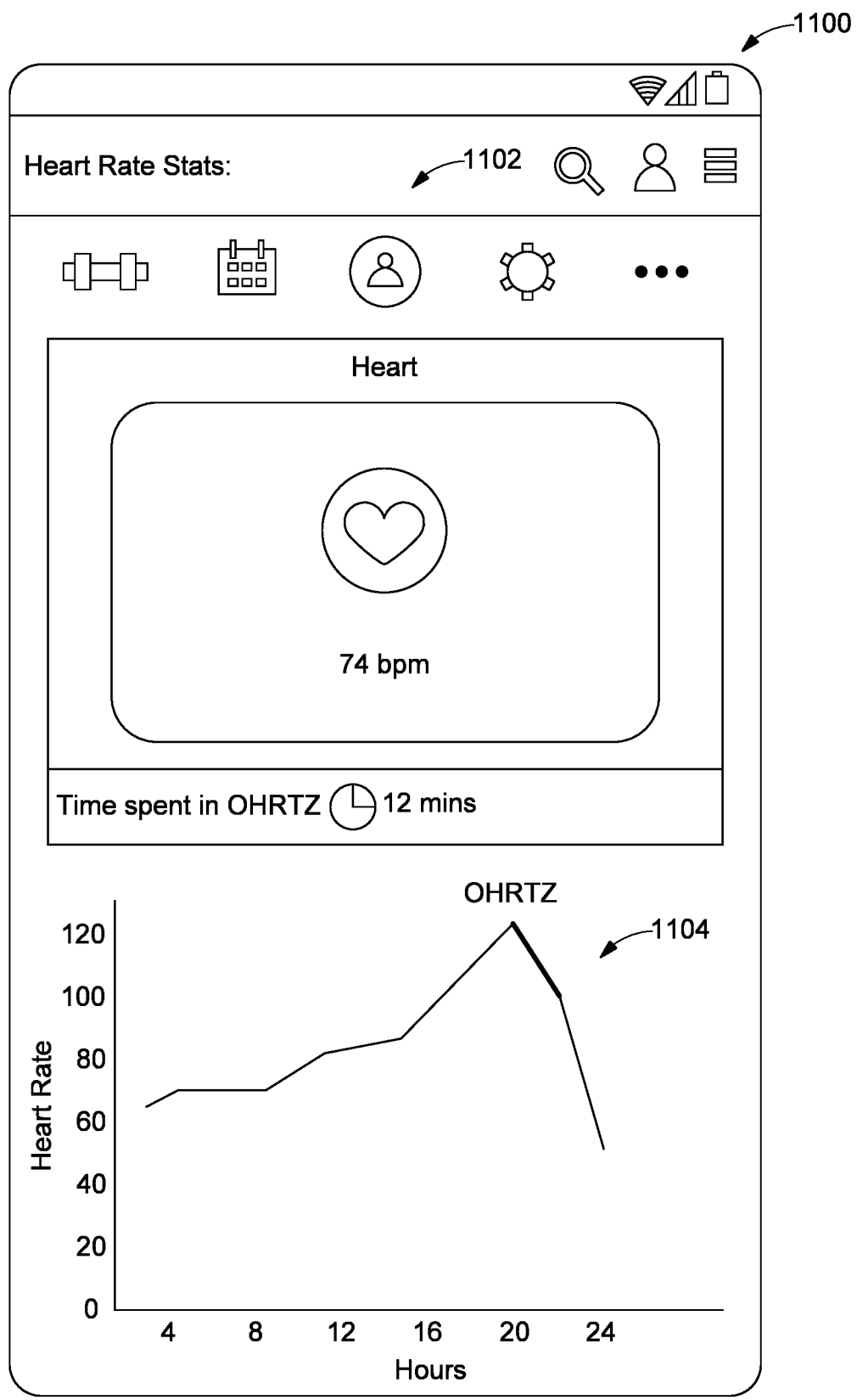
FIG. 11 illustrates a GUI depicting heart rate statistics of users while performing physical activities, in accordance with some exemplary embodiments.

Referring to FIG. 11, the heart rate statistics are illustrated on the webpage 1100, in accordance with some embodiments. The webpage may refer to a user app or any webapp as may be installed in user's personal smart device or any display device as may be accessible to the user. The user may access their own performance information as available in the webapp installed in user's personal smart device or the display device. For example, the user 102 may want to refer to any of the parameter from the list of given parameters such as "heart rate", "calorie count", and the like, or the user may want to know their 'optimum heart rate' while performing the activity or workout on a particular day. The webpage may optionally or always be populated with the historical information about multiple users. This historical information may be accessed or referred to by the users at any point of time before or after the activity has been performed. The historical information may include user's personal information, activity performance information, reps information, vital statistical information, instructional information given to the user, graphs representing user's previous performances, and the like.

As shown in FIG. 11, by way of example the heart rate statistics 1102 of the user may be illustrate that the heart rate is 74 bpm during the time when the user is active mode and performing the activities. The heart rate 74 bpm means that "1/74" beat(s) will occur every second. So, of graphical representation as in 1104, the user may see how the heart rate was varying during the time of performing physical activities or when the users were at rest or when the users were not at rest but not performing the physical activity as such. The heart rate may vary with respect to time during the day. The user may also get to know the optimum heart rate during the day and what time the user were in optimum heart rate zone. The optimum heart rate zone may be the time when the user had performed the activity at maximum capacity and while doing so the users heart was beating at maximum rate. The total time spent by the users 102 in optimum heart rate zone is also depicted in 1104.

Figure 12:
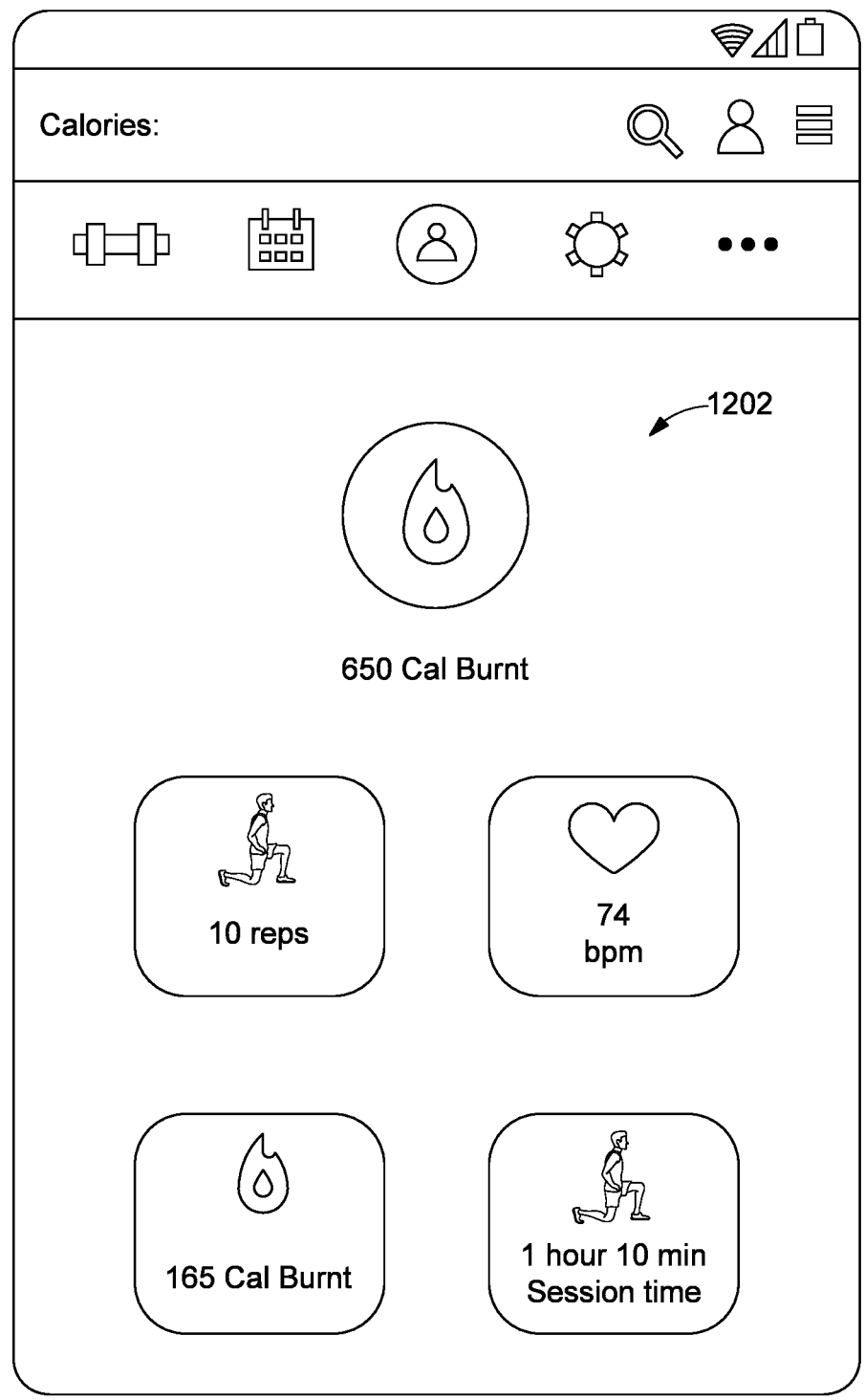
FIG. 12 illustrates a GUI depicting the calories burnt by users while performing physical activities, in accordance with some exemplary embodiments.

Like heart rate statistics, the calories statistics 1200 may also be illustrated as a GUI representation, as per FIG. 12, in accordance with some embodiments. The calorie statistics 1200 may provide information about the total amount of calories burnt by the user 102 or the group of multiple users altogether (102, 104, 106, and 108). The information about the calories burnt by the user 102 may be based on the performance of the user, number of repetitions taken by the user of the physical activity, the heart rate of the user while performing the activity, intensity of the user to carry out the physical activity, the speed of the user, and the intent of the user to achieve their personal goals. By intent it means that the user may be performing the activity in competition with respect to other users in the group and the user wants to achieve recognition or to become the best performer, so the user may burn more calories. Also, the calories burnt by each user may be considered as the determining factor for user rankings or best performer of the day or week or the month.

The webpage of the smart device, or display device, shows calories statistics on the display panel 1202 indicating various parameters calculated in relation to calories burnt information. By way of example, calories statistics in 1202 may represent information about the number of repetitions made by the user 102, the heart rate of the user, total time spent during the workout, calories burnt per physical activity during the entire workout session, and total calories burnt during the day including all the activities decided to be performed on that day. The calories to be burnt by the user may either be in the form of a set target given to the user by the trainer 112 or feedbacks rendered through AI, or the target may be decided by the users amongst themselves as a competitive target. Accordingly, the users may access their calorie burnt information from the GUI 1200.

Figure 13:
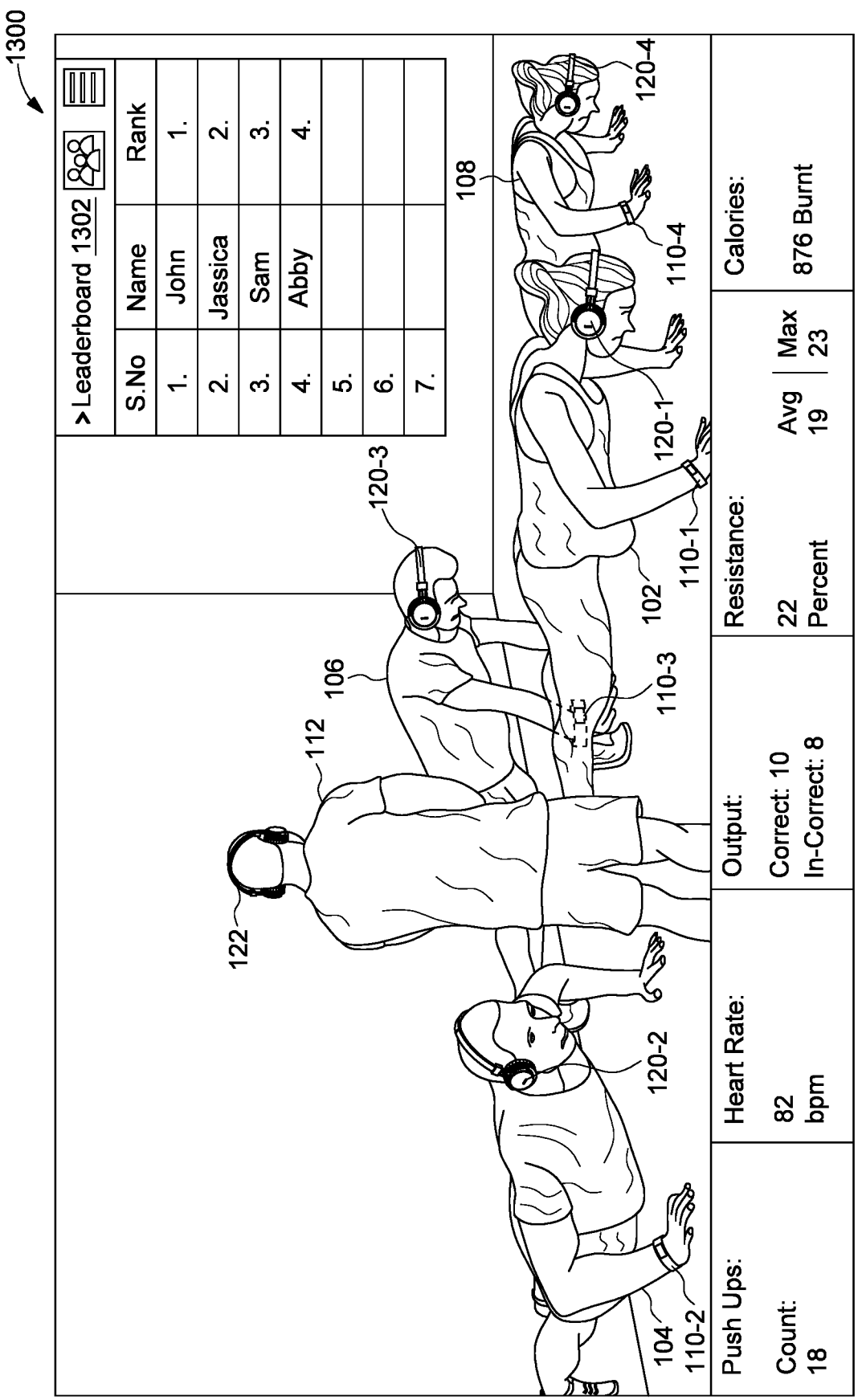
FIG. 13 illustrates a GUI depicting the leaderboard for multiple users while performing physical activity, in accordance with some exemplary embodiments.

In addition, to the calorie statistics GUI 1200, another leader board information performing the group workout may be provided to the users depicted as 1300 in FIG. 13, in accordance with some embodiments. As depicted in FIG. 13, the leader board 1302 represents comparative data of the multiple users (102, 104, 106, and 108) performing the group physical activity. The leader board data 1302 on top and bottom of FIG. 13, may further be explained in conjunction to leader board explained in FIGS. 8 and 9. Multiple users may be performing the activity with their respective pace or speed, thereby receiving AI assisted activity training and feedbacks by wearable headphones (120-1, 120-2, 120-3, and 120-4 respectively) or wrist bands (110-1, 110-2, 110-3, and 110-4) worn by the multiple users. The trainer may also provide the feedbacks 112 who is physically present in the room. The feedbacks generation may further be explained in conjunction to FIGS. 3 and 4.

In some embodiments, to provide feedback to the user 102 on their personal smart devices, i.e., third party smart devices, the smart mirrors 206 may be configured with an open Application Programming Interface (API), which may enable such integration seamlessly. Moreover, data received from the third-party smart devices may also be ingested into the system, via an API and may further be provided to the user 102 via the smart mirror 206 using visual elements (such as, graphs or charts), verbal and audio cues, or haptic cues. The data may also correspond to warnings and alerts generated by the third-party smart devices. By way of an example, a smart watch that is configured to sense blood pressure of the user 102 may send data regarding the user 102 having high blood pressure to the smart mirror 206. Accordingly, the smart mirror 206 may render the message "Your blood pressure is too high, please relax and take a break" to the user 102, orally or visually. Thus, the smart mirror 206 may act as a collator of feedback and a single point smart device for viewing all feedbacks. In other words, since the smart mirror 206 generates feedback on its own and receives feedback from other smart devices, the smart mirror 206 assimilates all feedback, refines it, and the presents it to the user 102 via the smart mirror. Thus, the user does not have to rely on multiple devices to receive several types of feedbacks.

Figure 14:
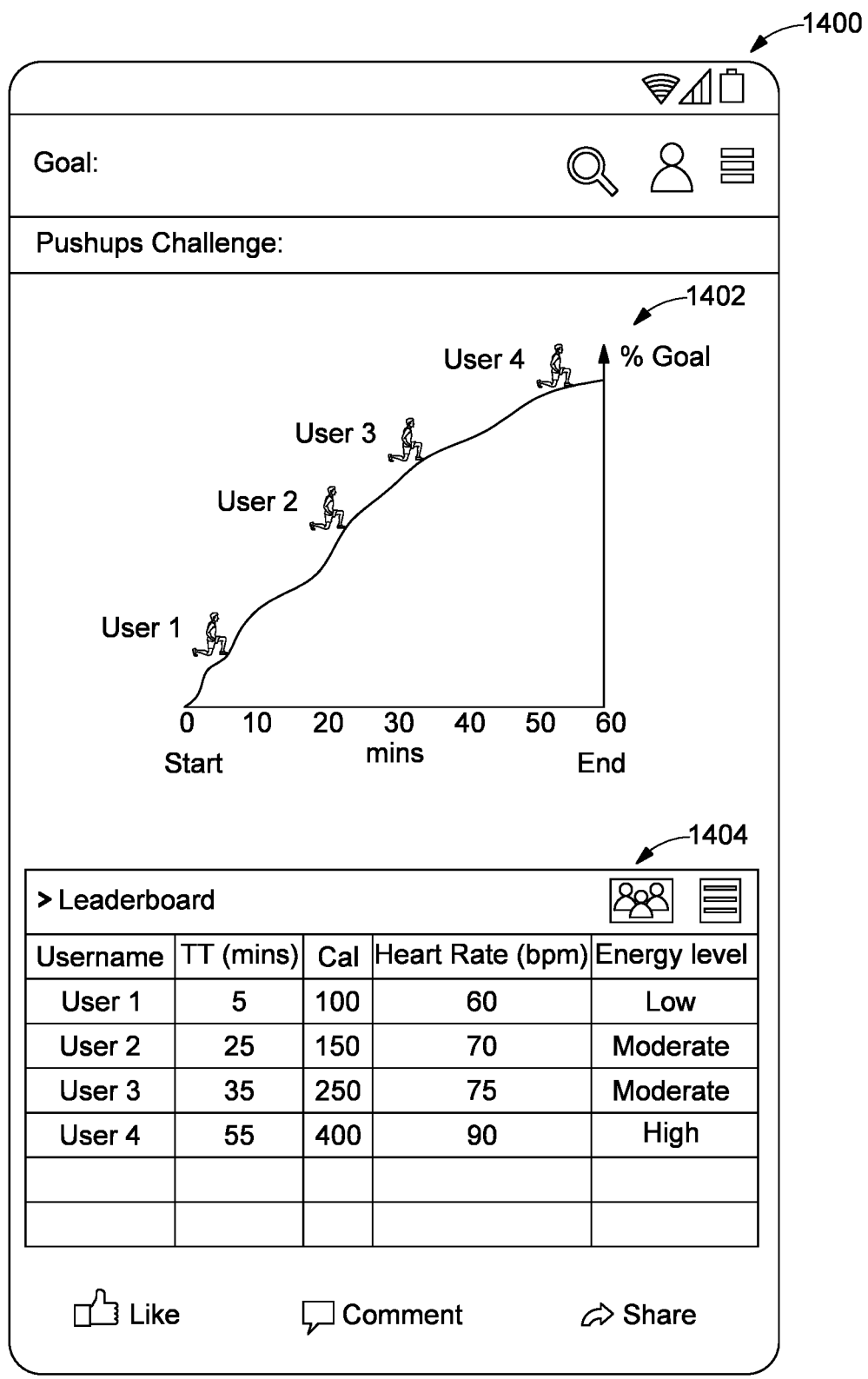
FIG. 14 illustrates a GUI depicting goal setting and performance matrix of multiple users, in accordance with some exemplary embodiments.

In accordance with some embodiments, as illustrated in FIG. 14, a goal setting GUI 1400 may be provided to access the comparative performance related information of multiple users (shown as user 1, user 2, user 3 and user 4, respectively). In some configurations, the users may set certain goals related to various physical activities to be performed may be at an individual level or at group level amongst the multiple users. In such case, the feedback may include status being displayed on the leader board 1404, regarding the time taken by the users to achieve the goals, heart rate of the users, calories burnt by the users while working towards the goal, and the energy level of each of the multiple users while performing the set goals. The goal setting may be done by one of the users (for example, user 4) to set a challenge for another user (for example, user 3) who is preferably from different team or may be from the same team as of user 4. So, depending upon the speed and time taken by various users the percentage achievement of respective goals may be determined for the multiple users and may be shown as 1402.

By way of example, user 4 may be seen at the first position by climbing up the mountain or the challenging ladder and meeting the goal challenge in each period. So, the energy level of user 4 may be comparatively high or at the maximum level as compared to energy level of user 1 who is still seen to be at a lower position or the last position in the ladder. Hence, user 1 seems to have low energy levels, so for the next time different targets or goal challenge would be assigned to user 1 depending upon their current and past performances of performing the activities. Thus, the goal setting may be based on the number of challenges won by the users, past performances of the users, and based on various parameters determined for the users, as shown in the leader board 1404. By way of example, in 1402 a pushup activity challenge is depicted to be taken up by the group of users. The challenges may keep on changing based on the various activity types decided for the users and their teams. The goal challenge may also be decided via AI assisted activity training or by the trainer 112 himself or may be by the users themselves to make their workouts more challenging and competitive.

Moreover, goals set by various users for activities and respective percentage completion of goals may optionally be shared or published on social media platforms. As may be appreciated, feedback provided to users may also be shared within group of users on social media, including friends, social circles, and classes that may be connected in real-time. Further, in an embodiment, when the user 3 or user 4 is performing an activity, content media related to the activity performance may be created and shared with one or more users via social media applications. The content media may also be augmented with information that may include but is not limited to current health status of the user, exercising routine, exercising capacity, previous records, or points earned by users in any activity or overall position of the user amongst the group of users.

Figure 15:
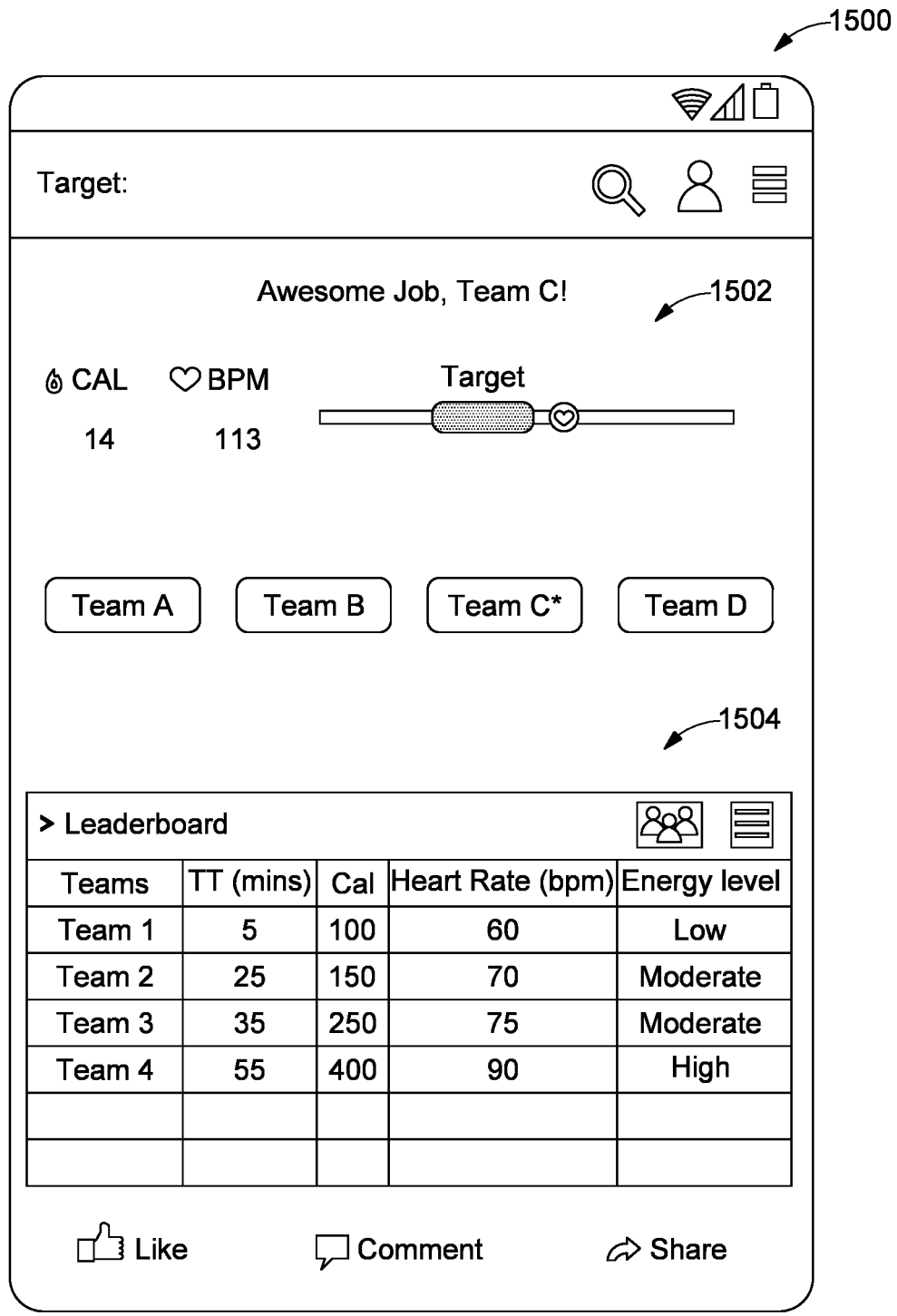
FIG. 15 illustrates a GUI depicting the targets and achievements of multiple users, in accordance with some exemplary embodiments.

In an alternative embodiment, as illustrated in FIG. 15, various target-based GUIs 1500 may be seen including the leader board analysis 1504 and the achievements of different user teams 1502. The targets may again be set in conjunction with the goal setting exercise as explained in FIG. 14 above. Moreover, the targets may determine the results to be achieved by the user or the team of the multiple users as formulated by either the users themselves, or by the human instructor, or by the AI assisted activity training. When deciding the targets various teams may be formulated whereby the users may be clubbed in some teams and different team names be rendered to the group of users teamed up together for example in this case as shown in 1502, team A, team B, team C, and team D have been formed. Each of these teams may be given a set target to be achieved in the stipulated duration to become the best team or the star performing team of the day or of that month. Accordingly, the targets are subjected to variations in terms of past or current teams performances.

In addition, various statistical information may also be provided for various teams to be part of GUI 1502, for example heart rate of the team members, calorie burnt by respective teams or their members, and the percentage of target achieved by the teams individually. Accordingly, the teams meeting most of their set targets would be highlighted as "XYZ is best performing team" or "best team" or "outstanding team," etc., and this achievement may be made visible to the other competitive teams or their team members, respectively. By way of example, one feedback for the teams may be "Awesome Job, Team C!", meaning Team C have achieved their targets on time prior to other teams. So, Team C, is given the best performing team ranking and a star may be flashed on the screen above the name of Team C. Further, the leader board 1504 may depict various information about each team's performances including average time taken (in minutes) by each of the teams to perform the targeted activity, team's names, the calories burnt by each team, heart rate statistics, and team's energy levels.

With reference to FIGS. 14 and 15, the set of activities are chosen based on specific timeframes or based on various goals or targets determined for the users. These set of activities are presented on a GUI 1400 or 1500 of the smart mirrors 206 or 210 and/or display devices, respectively. The smart mirrors or the display devices may optionally include but not limited to a mirror, a television screen, a desktop/laptop monitor, or any other personal display devices as may be available with the users. At the display screen 116 or on the GUI 1500 or 1400, multiple options may be presented to the user 102, which may include, but are not limited to a new of set activity categories, the last set of activity categories performed by the user 102, activity categories that have been frequently accessed by the user 102, and exercises sorted based on the duration of use may be presented on the GUI 1500 or 1400.

In context to the physical activities various activity categories may be formed including an 'all' activity category, an 'abs' category, an 'arms' category, a 'back' category, a 'chest' category, a 'glutes' category, a 'legs' category, a 'punch' category, a 'shoulder' category, a 'squats' category, and a 'triceps' category. As discussed before, each of the activity categories may further include a plurality of activities. By way of an example, the 'abs' category may the following activities: core scissors and elbow knee; the 'arms' category may include the following activities: a band lateral raise, a band lateral side stretch, a front hook, a front uppercut, side boxing; the 'back' category may include the following activities: a front kettlebell, side deadlift a dead bug, and squat thrusters; the 'chest' category may include the following activities: side burpees, side push-ups, and front push-ups; and the 'glutes' category may include the following activities: lateral squat, side squat, side burpees, a dumbbell squat press, and a front squat.

Further, the legs' category may include the following activities: standing hip extension, standing hip flexion, hip abduction, quick feet abduction, bird dog, cross behind lunge, front kettlebell, side deadlift, dead bug, and front lunges; the 'punch' category may include the following activities such as "front hook", or "front uppercut", or "the 'squat' category may include the following activities: lateral squat, side squat, side burpees, dumbbell squat press, squat thrusters, drop squat, and front squat; the 'shoulder' category may include the following activities: shoulder dislocates, band lateral raise, band lateral side stretch, front hook, front uppercut, side boxing, side lunges, side burpees, front push-ups, and dumbbell squat press; the 'squats' category may include the following activities: lateral squat, side squat, side burpees, and front squat; and the 'triceps' category may include the following activities: front triceps overhead, front triceps sitting, and front triceps sitting.

The user 102 may be provided with easily accessible GUI to select at least one of the activity categories out of plurality of activity categories, based on at least one of voice-based or touch-based user input. Thus, based on the user input, a mix of one or more activities may be presented to the user 102 via GUI. The user may optionally select at least one or more of plurality of activity categories available in the list and may also provide specific activity attributes required for each of the one or more activities. Alternatively, the user 102 may be able create a new activity category which may either be accessed via a server or an API or may be recorded by the at least one of the users themselves using the camera of the smart mirrors 206 and 210 or the display device 116. The new activity category may then get added to the required GUI.

In some configurations, the user 102 may select an activity training plan from the plurality of activity categories. For example, the user 102 may generate a voice-based command saying: "select arms" to select the 'arms' activity category and may subsequently say "select a band lateral raise" and then say "select a band lateral side stretch" to select some activities listed within the 'arms' category. Thereafter, the user 102 may provide activity attributes for each of the activities selected by the user 102. As explained before, the one or more of activity attributes may include, but are not limited to sequence of execution of the activity, a number of sets for performing each of the activity, a count for each of the activity in each of the sets, duration of performing each of the activity, rest period between each of the sets, intensity of performing each of the activity, difficulty level of performing each of the activity, or pace of performing each of the activity. Additionally, activity attributes may also include level of expertise for performing an activity. The level of expertise to be selected by the user 102, for example, may include a beginner level, an intermediate level, or an advanced level.

In further continuation, once the user 102 has selected any main category of the activity, the user 102 may further select the sub-category, for example user selected chest category and the sub-category as side push-ups activity as shown in FIG. 9. Thereafter, the user 102 may be indicated to define activity attributes for the side push-ups activity. For example, various parameters of activity attributes may include number of repetitions, number of sets, interval between sets, and expertise level as a "Beginner" (not shown). Once the user 102 has provide the required activity attributes, the user 102 may activate the start button in the activity attribute and the activity may be presented or saved as a workout, as a multimedia content (not shown) for the user 102 in conformance with the activity attributes defined by the at least one of the users, or the group of one or more users. This is further explained in conjunction with FIG. 16.

Figure 16:
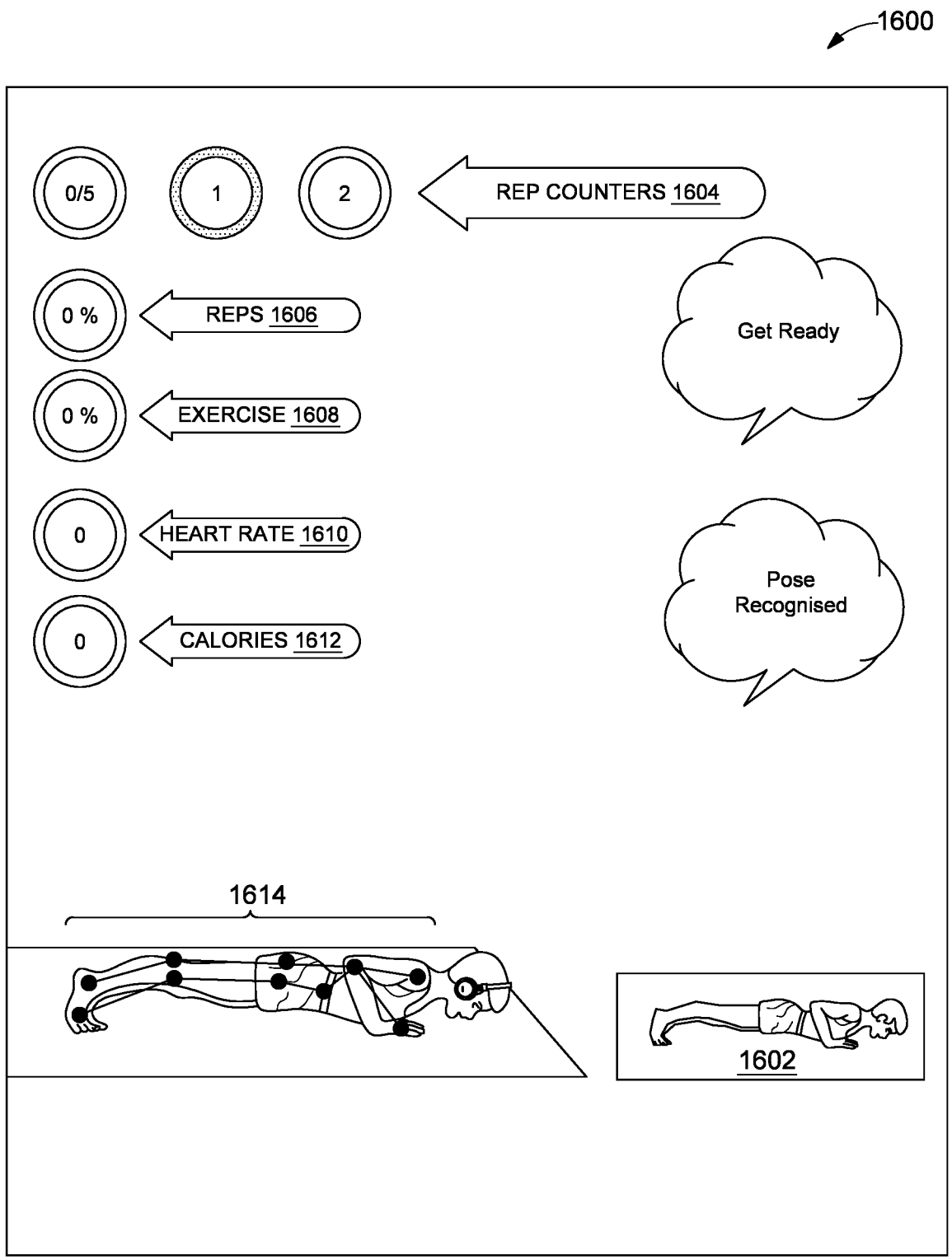
FIG. 16 illustrates a GUI depicting initiation and monitoring of user activity performance in response to presentation of guidance instructions associated with an activity, in accordance with some exemplary embodiments.

Referring now to FIG. 16, a GUI 1600 depicting initiation and monitoring of user activity performance in response to presentation of guidance instructions associated with an activity is illustrated, in accordance with some embodiments. With reference to FIG. 16, once the user 102 has selected the side push-ups activity and provided the activity attributes, the user 102 may be presented with a plurality of guidance instructions (as multimedia content) performed by a virtual assistant 1602. The plurality of guidance instructions may guide the user 102 to properly perform the side push-ups activity.

Before initiating the plurality of guidance instructions, the virtual assistant 1602 may instruct the user 102 via a video and/or aural/audio message to "get ready". The user 102 may then take an initial pose for initiating the activity. The guidance instruction as to be provided to the user may also optionally be provided as a haptic instruction, or any other graphical instruction. The guidance instructions thus, becomes important when the user 102 is setting up the initial pose, since the user 102 may not be able to interact with the GUI of the smart mirror or the display device by way of touch or any other input means to start the activity. For example, while holding an elastic band in a certain way or while holding weights, the user 102 may not be able to physically interact with the smart mirror 206, hence, the voice-based instruction is the most effective way to interact. A video/reflection of the user 102 overlayed with a 3D model of the user/trainer, a skeletal pose model 1614, or skeletal points may be provided on the GUI 1600. The overlaying is enabled based on a video of the user 102 captured by cameras and further processed by the AI model in real-time. As may be appreciated, the cameras capturing the user 102's pose and motion mid-way or along a long side of the smart mirror 100 may be adjusted for allowing a better aspect ratio of the user 102's pose.

Once the user 102 takes an initial position and pose to start performing the side push-ups, an AI model may determine whether the detected pose and position matches an initial pose and position mapped to the side push-ups activity. If the detected pose does not match with the initial pose and position, the AI model may instruct the user 102 to correct the initial pose and position. By way of an example, the AI model may instruct the user 102 by way of the message such as "pose incorrect", or "keep the back straight", or "keep the hand under shoulders", or "keep the arms straight", or the like.

Only when the initial pose and position taken by the user 102 is correct, feedback, for example, "pose recognized," may be rendered to the user 102. Thereafter, the user 102 may be presented with the plurality of guidance instructions by the virtual assistant 1602. The user 102 may then need to follow the plurality of guidance instructions as instructed to perform the side push-ups activity. Additionally, while the user 102 is performing the side push-ups activity, user performance parameters are also displayed along with on the GUI 1600. As depicted in the GUI 1600, a section 1604 displays the target reps for the user 102 and the current reps performed by the user, a section 1606 displays a specific percentage of reps completed by the user 102, a section 1608 displays a specific percentage of the activity completed by the user 102, a section 1610 displays a heart rate of the user 102, and a section 1612 displays the calories burnt by the user while performing the activity. The GUI 1600, may further optionally be provided with a stopwatch or a timer clock, for tracking the time taken by the user to complete the target reps or time take by the user for completing the current reps. In addition, the other statistical parameters may optionally be depicted via GUI which may further be integrated via API inputs.

It may be noted that, display of the plurality of guidance instructions as may be provided to the user and arrangements related to the placement of visual information as discussed above, may be adjusted based on eye motion, voice-based input, a hand gesture, or position of the user so that the guidance instructions and related information may relatively and appropriately be placed to the user 102's viewing angle and current position.

Figure 17:
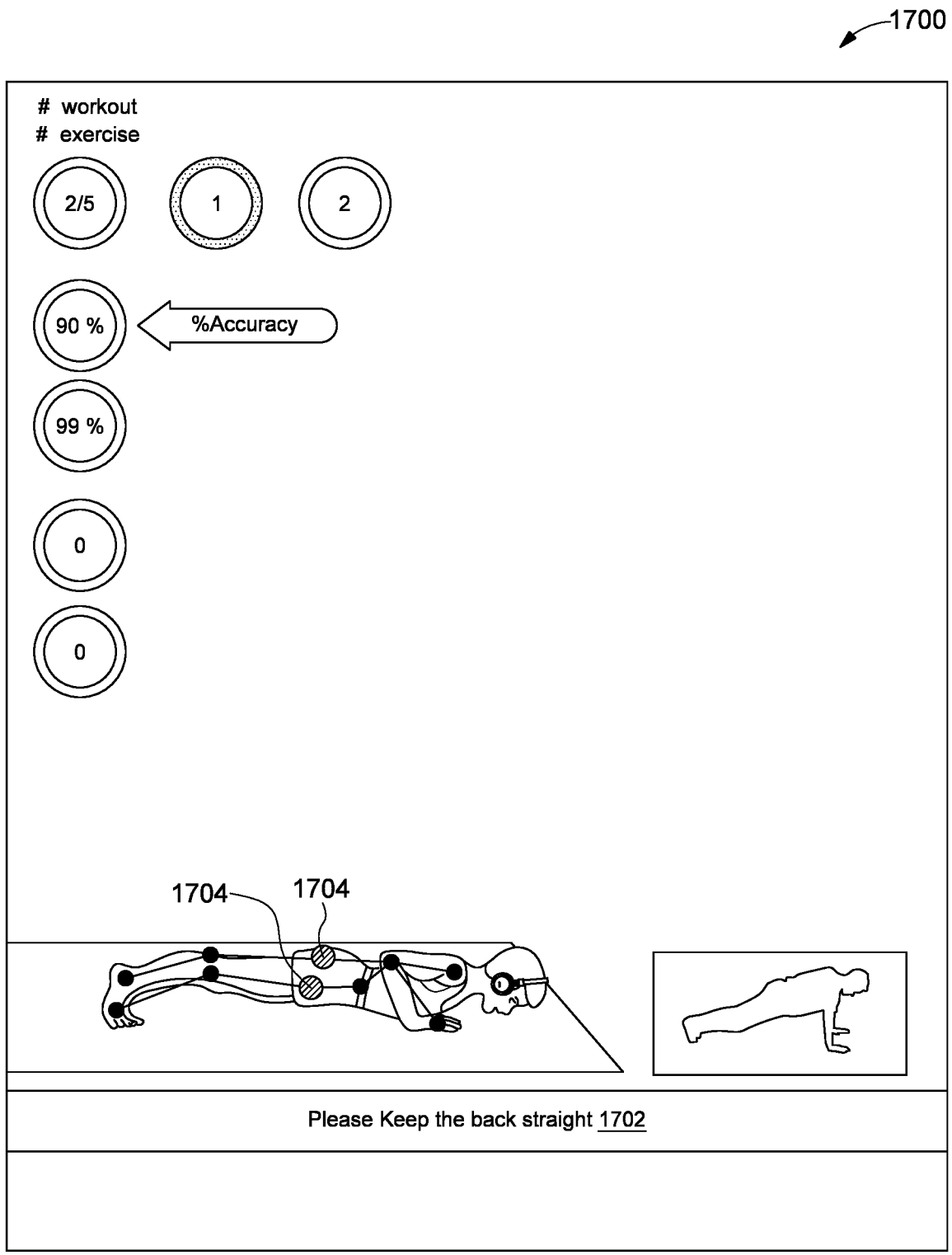
FIG. 17 illustrates a GUI depicting feedback rendered to a user during performance of an activity by the user, in accordance with some exemplary embodiments.

In an embodiment, as shown in FIG. 17, a GUI 1700 depicting feedbacks being rendered to the user 102 while performing an activity is illustrated. With reference to FIG. 17, once the user 102 starts performing the side push-ups activity, the AI mode, in real-time, may enable live video, capturing performance of the user 102. Thereafter, the AI model may, in real-time, determine user performance parameters and compare the performance parameters with the target performance parameters to determine any deviations thereof. In an exemplary embodiment, a deviation may correspond to the current pose of the user 102 while performing side push-ups being incorrect. More specifically, back of the user 102 may not be straight as required for side push-ups.

Thus, in response to the above detection of deviation, the AI model may provide feedback to the user 102 to correct the posture via the GUI 1700. More specifically, the feedback may be displayed to the user 102 via the GUI 1700 as a textual message 1702. Additionally, specific skeletal points 1704 overlayed over the user 102's reflection/video may be distinctly highlighted, for example, by changing the color of these skeletal points 1704 or rendering specific graphical elements over these skeletal points 1704. In addition to displaying the feedback on the GUI 1700, audio message may also be rendered to the user 102, where the instructions such as "please keep the back straight", or "lower the hips", or "raise the hips", or the like, may be provided to the user 102 optionally in an aural form. The audio messages provide to the user may sometimes indicate an error like "hips being too low" and may be dangerous or it may indicate a warning like "hips too high" and may not be dangerous. In conjunction with the feedback display on GUI 1700, additionally percentage accuracy of performing the activity may also be displayed.

Figure 18:
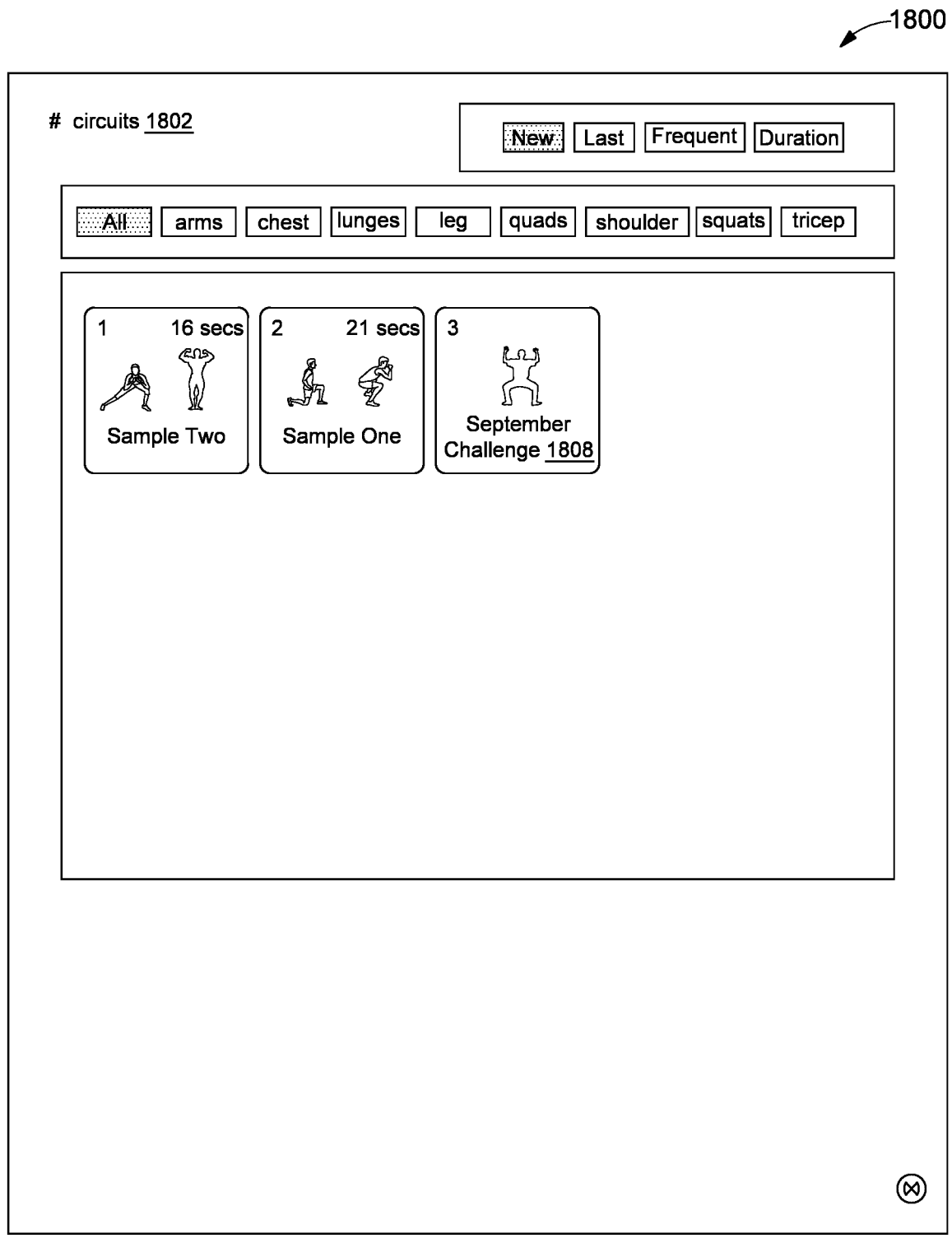
FIG. 18 illustrates a GUI depicting an activity training circuit and monthly challenge of the training circuit, in accordance with some exemplary embodiments.

In accordance with some embodiments, as illustrated in FIG. 18, the GUI 1800 depicting creation of a new activity training circuit and subsequently saving the activity training circuit as an adaptive or optional activity training circuit or as an alternative workout schedule. With reference to FIG. 18, the user 102 may select an option to create a new or adaptive activity circuit within a circuits section 1802. When the user 102 selects an option to create a new activity circuit, or a new theme, or a new routine, or any other new activity to be performed by the user for example Zumba, or dance, etc., a message box may be presented to the user asking the user 102 to provide a name for such a selection. The user 102, for example, may assign a name "September Challenge" for the new activity circuit 1808. The user 102 may also be able to select a set of activities that may be included in the new activity circuit. Then, the user 102 may further add a set of attributes for each of the set of activities that have been selected to be included in the new activity circuit. The attributes may be defined, for example, the number of sets to be performed, and exercise interval, for example for sample one the interval may be of 21 seconds, whereas for sample two the interval may be of 16 seconds. On completion of selection of the set of attributes the user 102 may save the new activity circuit. The new activity circuit may optionally be added to an existing set of activity circuits as September challenge 1808, as depicted in FIG. 18. The activity circuits or themes or routines as may be created by the user 102 may optionally be created by the human trainer or by some other expert trainer who may create circuits for all the users.

Figure 19:
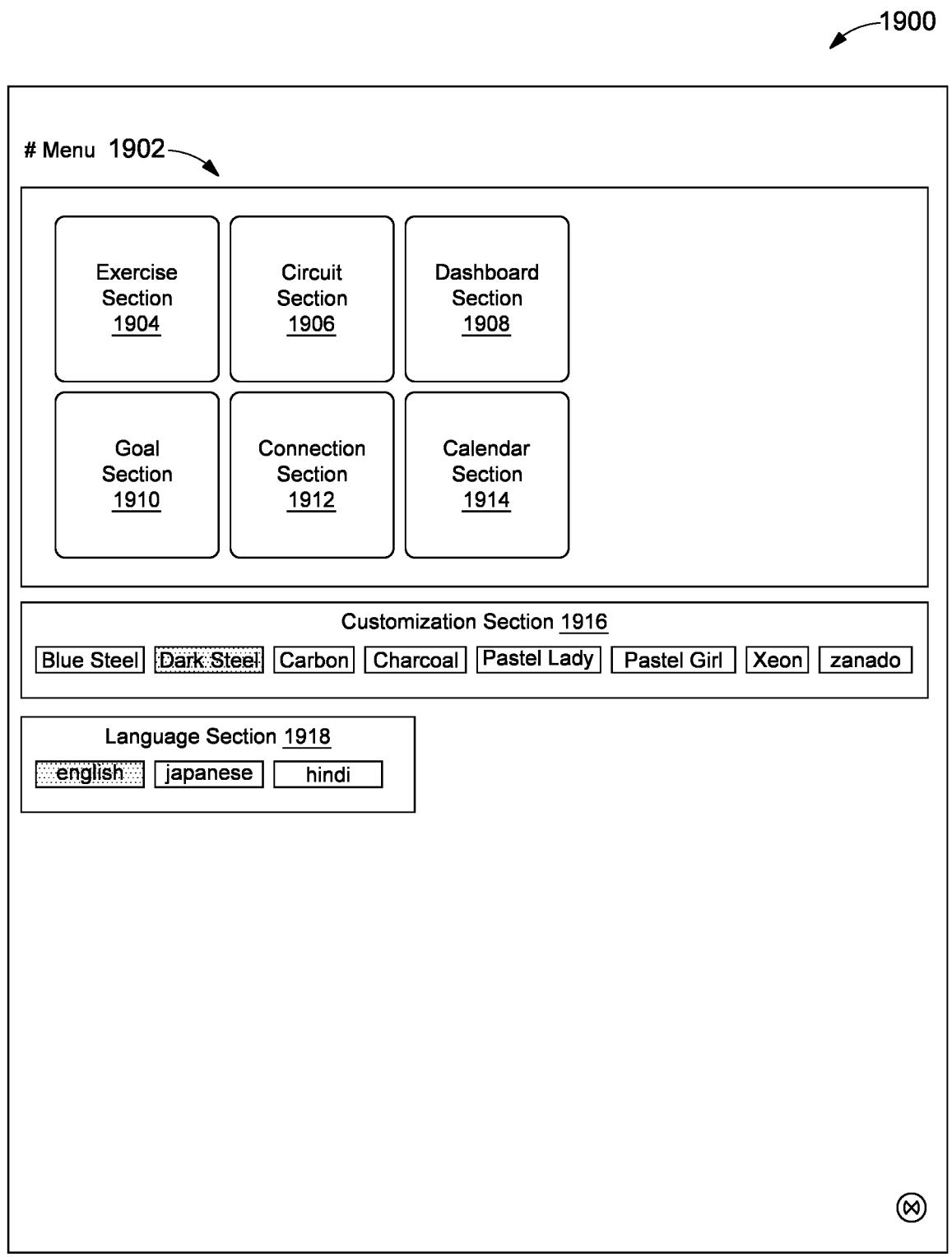
FIG. 19 illustrates a GUI depicting options associated with menu, customizations, and languages that may be provided to a user, in accordance with some exemplary embodiments.

Referring now to FIG. 19, a GUI 1900 depicting options associated with menu, customizations, and languages that may be provided to the user 102 is illustrated, in accordance with some exemplary embodiments. The GUI 1900 corresponds to a menu 1902 (or a home menu) that includes various shortcuts to exercise section 1904, circuit section 1906, dashboard section 1908, goals section 1910, connection section 1912, and a calendar section 1914 may be presented to the user 102. The user 102 may select an activity category and subsequently an activity to be performed using the exercise section 1904, the circuit section 1906 to create a new circuit or select an existing circuit, and the dashboard section 1908 to view various activities being performed by one or more users and their corresponding progress related to an activity over a period. The dashboard section 1908 may also display statistics related to activities being performed by the user 102 over a period. The statistics may relate to, for example, displaying reps performed by the user 102 managed as per date, time, volume, percentage accuracy, and review heart rate, calorie count.

Further, the goals section 1910 may enable the user 102 to set a personalized goal related to one or more activities for the user 102. The goal, for example, may be a new goal or a pending goal that needs to be achieved. The goal may also be set for a group of users. The connection section 1912 may enable the user 102 to connect to fitness gadgets and devices to enhance and share activity status of the user 102 with one or more users and third-party smart devices. The user 102 may also be able to select a preferred list of communication interfaces to be used, for example, Wi-Fi, Bluetooth, NFC, RFID, or infrared. Further, the user may use the calendar section 1914 102 to schedule an activity for a particular day (or a schedule including multiple days) and remind the user 102 about his upcoming or pending activities.

The menu 1902 may further include a user friendly and customizable section 1916, using which, the user 102 may select one or more display themes for customizing the look and feel of various GUIs of the smart mirror 206 and/or the display device 116. The menu may alternatively be replaced and written as configuration (not shown) which may include 'user profile' information. The themes, for example, may be set to one of blue steel, dark steel, carbon, charcoal, or the like. The menu 1902 may also provide the user 102 with an option to select a source language from a language section 1918. The user 102 may use the source language for communicating or for providing voice-based instructions via smart mirror 206. Additionally, the source language may also be the preferred language to display various content on the smart mirror 206 and/or the display device 116.

Figure 20:
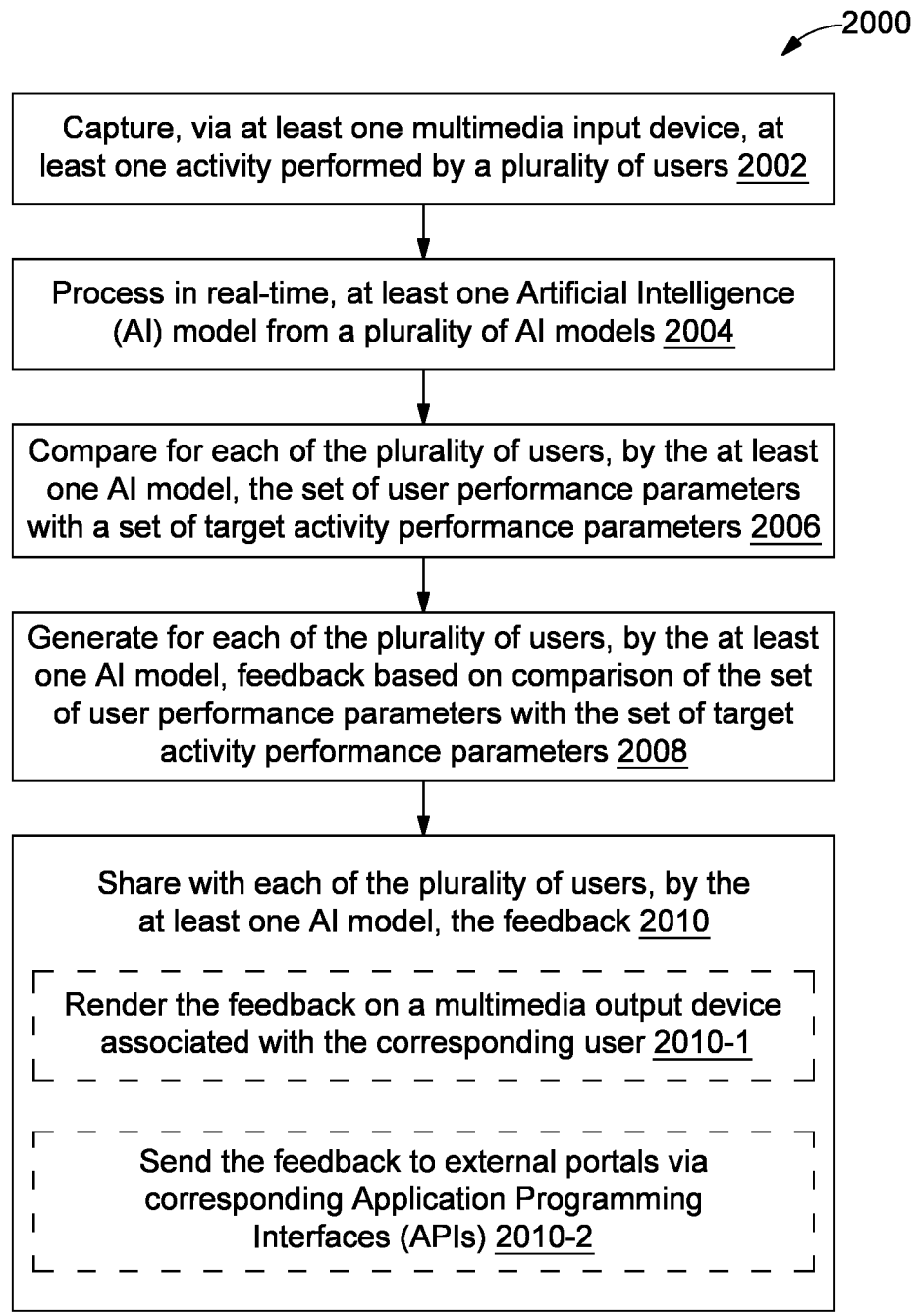
FIG. 20 illustrates a flowchart of a method for capturing inputs on user activity and rendering feedback in response to user performance, in accordance with some embodiments.

In accordance with some embodiments, a flowchart of a method 2000 for providing feedback via AI, is illustrated in FIG. 20. The method 2000 includes a step to capture, via at least one multimedia input device, at least one activity performed by a plurality of users 2002. At least one of the activities performed by a plurality of users may include a plurality of activities, and the plurality of activity categories may be presented as a multimedia content. The multimedia input device may be a fitness mirror, a smart mirror, a display screen, a mobile device, such as, but not limited to a mobile phone, a tablet, a smartwatch, a laptop, or the like. Further, the user may be personal coach, trainer, gym activity expert, physical therapist, occupational therapist, physical education teacher, martial arts teacher, choreographer, sports personality, team coach, demonstrators, and other trainers in health and fitness.

Further, based on the presented plurality of activity categories, the method 2000 may process in real-time, at least one Artificial Intelligence (AI) model from a plurality of AI models 2004 and compare for each of the plurality of users, by the at least a one AI model, the set of user performance parameters with a set of target activity performance parameters at step 2006. Contemporaneous to the user activity performance, the feedback may be generated for each of the plurality of users, by the at least one AI model, feedback based on comparison of the set of user performance parameters with the set of target activity performance parameters 2008. Sharing with each of the plurality of users, by the at least one AI model, the feedback 2010 and rendering feedback to the user on a multimedia output device associated with the corresponding user 2010-1 and sending the feedback to external portals via corresponding Application Programming Interfaces (APIs) 2010-2. This has already been explained in detail in conjunction with explanations to FIG. 1-4.

Figure 21:
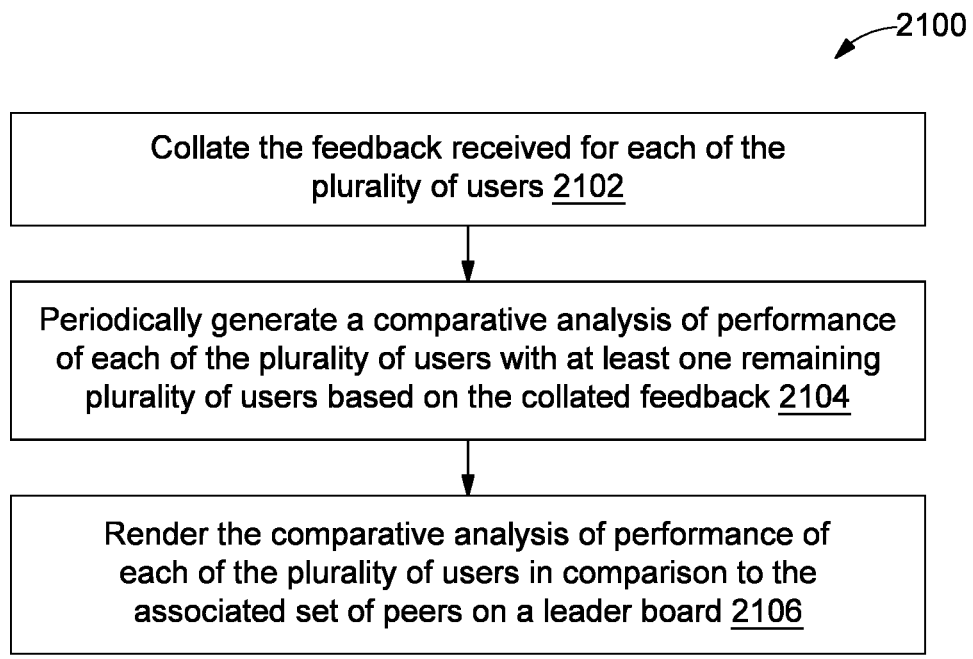
FIG. 21 illustrates a flowchart of a method for collating the feedbacks for multiple users, in accordance with some embodiments.

Referring now to FIG. 21, a flowchart of a method 2100 for collating the feedback received for each of the plurality of users 2102 is illustrated, in accordance with some embodiments. The method 2100 may periodically generate a comparative analysis of performance of each of the plurality of users with at least one remaining plurality of users based on the collated feedback 2104. The method may further comprise rendering the comparative analysis of performance of each of the plurality of users in comparison to the associated set of peers on a leader board 2106. This has already been explained in detail in conjunction with FIGS. 4A, 4B and 6-8.

Figure 22:
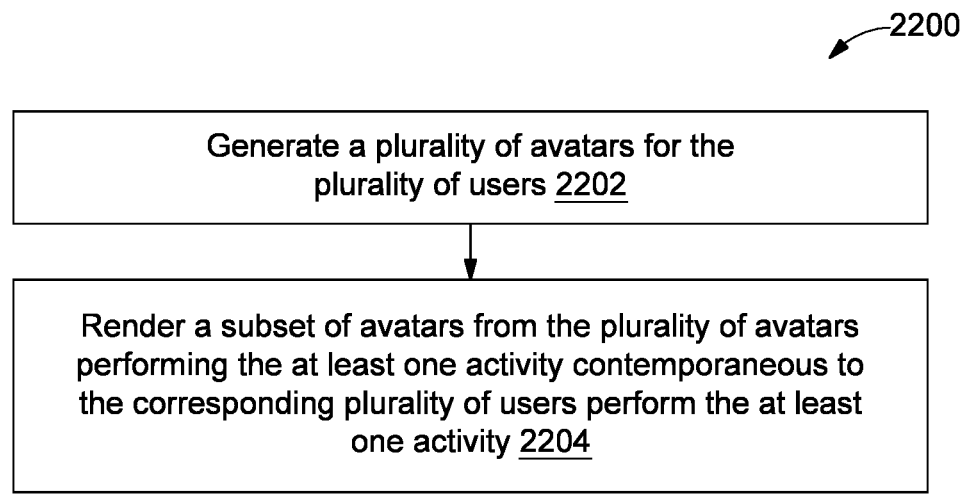
FIG. 22 illustrates a flowchart of a method for generating instructions in form of avatars for multiple users, in accordance with some embodiments.

Referring now to FIG. 22, a flowchart of a method 2200 for generating a plurality of avatars for the plurality of users 2202 is illustrated, in accordance with some embodiments. The method may include rendering a subset of avatars from the plurality of avatars performing the at least one activity contemporaneous to the corresponding plurality of users perform the at least one activity 2204. This has already been explained in detail in conjunction with explanations to FIG. 3.

Figure 23:
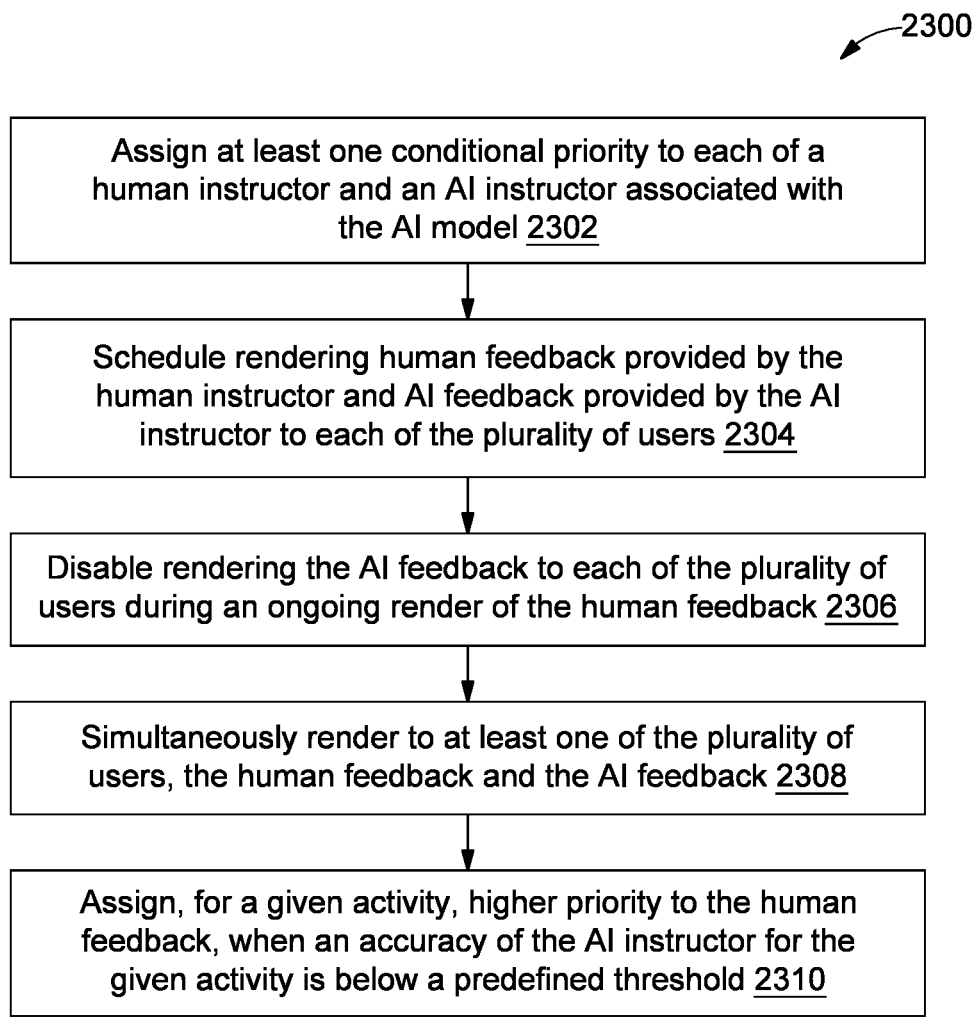
FIG. 23 illustrates a flowchart of a method for assigning a conditional priority and rendering feedbacks to multiple users based on the conditional priority, in accordance with some embodiments.

Referring now to FIG. 23, a flowchart of a method 2300 for assigning at least one conditional priority to each of a human instructor and an AI instructor associated with the AI model 2302 is illustrated, in accordance with some embodiments. The method 2300 includes scheduling rendering human feedback provided by the human instructor and AI feedback provided by the AI instructor to each of the plurality of users at steps 2304 and disabling rendering the AI feedback to each of the plurality of users during an ongoing render of the human feedback at steps 2306. Further, simultaneous rendering to at least one of the plurality of users, the human feedback and the AI feedback at steps 2308 is provided. Furthermore, the method of 2300 may include assigning, for a given activity, higher priority to the human feedback, when an accuracy of the AI instructor for the given activity may be below a predefined threshold at steps 2310, respectively. Alternatively, it may happen that for a given activity, higher priority may be given to the feedback generated by AI model, when an accuracy of the human instructor for the given activity may be below a predefined threshold. This has already been explained in detail in conjunction with explanations to FIGS. 6-8, and 16-17.

To elaborate further, timing and duration of an utterance related to the feedback for the user may be crucial, as may be appreciated. For example, when the user is performing the activity fast, some feedback messages may get obsolete before being generated and spoken. Additionally, certain feedback messages may become repetitive and unnatural. Further, some of the feedback messages may have a higher priority, for example, feedback messages related to warnings and errors. The priority of the messages may be handled based on priority queues. Also, the AI mode may be used to give a more natural dialogue to the feedback messages.

As may be appreciated, in some configurations, the user and/or human instructor using the smart mirror 206, or 210, may use the voice-based input to edit the incoming video sample or highlight the activity and/or guidelines provided by the virtual assistant, add voice or text feedback on the smart mirror 206. Additionally, the user 102 and the human instructor may be permitted to add or remove background image as used in the smart mirror. The voice-based input may be used to create and save playlists, add metadata to the playlists, add comments using speech-to-text mechanism and audio feedback to the playlists and the activities, record a new activity category, edit and clip the activity to be performed, tag an exercise with hashtags, for example, type of exercise, muscle groups or level of difficulty, replace an exercise clip with an alternative version, share playlists and exercises with other users, dictate a message for another user when sharing the playlists.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Thus, the method and system may present activity categories to the user and the user may chose the activity to be performed using a voice-based input in a source language. Further, an NLP model may process the voice-based input to extract an activity selected by the user. Further, the disclosed system and method initiates presentation of multimedia content in conformance with the activity. A video of the user activity may be captured using a camera and the video is processing using the AI model to extract user performance parameters. The AI model may generate a feedback based on the user performance parameters and may render the feedback on the smart mirror.

As will be appreciated by those skilled in the art, the techniques described in the various embodiments discussed above are not routine, or conventional, or well understood in the art. The techniques discussed above may provide presenting, by a rendering device, a plurality of activity categories to a user. Each of the plurality of activity categories may include a plurality of activities. The plurality of activity categories may be presented as multimedia content. The technique may receive a voice-based input from the user. The voice-based input may include an activity training plan comprising a selection of at least one activity from at least one of the pluralities of activity categories and at least one activity attribute associated with each of the at least one activity, and wherein the voice-based input is in a source language. Further, the technique may process, by a Natural Language Processing (NLP) model, the received voice-based input to extract the selection of at least one activity and the at least one activity attribute. The NLP model may be configured using a single language, and wherein the single language is an intermediate language. Contemporaneous to receiving the voice-based input, the technique may initiate presentation of a multimedia content in conformance with the at least one activity and the at least one activity attribute. The multimedia content may include a plurality of guidance instructions performed by a virtual assistant corresponding to the at least one activity. Further, the technique may detect, via at least one camera, initiation of a user activity performance of the user in response to initiation of the multimedia content. The user activity performance of the user at a given time may include imitation of one of the at least one activity. Further, the technique may capture, via the at least one camera, a video of the user activity performance of the user. The at least one camera is placed at distributed locations. The technique may process in-real time, by an Artificial Intelligence (AI) model, the video to extract a set of user performance parameters of the user based on the user activity performance. The technique may use the AI model to generate a feedback based on differential between the set of user performance parameters and a target set of performance parameters. Contemporaneous to the user activity performance, the technique may render the feedback to the user in at least one of an aural form, a visual form, or as haptic feedback.

As will be appreciated by those skilled in the art, the techniques described in the various embodiments discussed above are not routine, or conventional, or well understood in the art. The techniques discussed above may provide receiving, via a communication device, a user input from a user in a source language. The user input may be least one of a textual input and a verbal input. The technique may translate the user input, using a machine translation model, to generate a plurality of translated user inputs in an intermediate language. A confidence score may be associated with each of the plurality of translated user inputs. Each of the plurality of translated user inputs may be in text form. The technique may generate for the plurality of translated user inputs a plurality of sets of intermediate input vectors in the intermediate language using the SNLP model configured only using the intermediate language. The technique may process the plurality of sets of intermediate input vectors in the intermediate language using at least one of a plurality of predefined mechanisms to identify a predetermined response. The technique may translate the predetermined response to generate a translated response. The translated response may be rendered to the user.

Considering the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for capturing and coordinating physical activities of multiple users, the method comprising:
   capturing, via at least one multimedia input device, at least one activity performed by a plurality of users, wherein a first set of users from the plurality of users perform the at least one activity in one or more distributed locations and a second set of users from the plurality of users perform the at least one activity in said one or more distributed locations;
   processing in real-time, by at least one Artificial Intelligence (AI) model from a plurality of AI models, the captured at least one activity for each of the plurality of users to determine, for each of the plurality of users:
      a set of user performance parameters based on current activity performance, wherein the at least one AI model is configured based on target activity performance of an activity expert, a plurality of correct and incorrect movements, and tolerance metrics associated with the current activity, and wherein each of the plurality of AI models are trained and configured for a given activity;
   comparing for each of the plurality of users, by the at least one AI model, the set of user performance parameters with a set of target activity performance parameters, wherein the set of target activity performance parameters is determined based on inputs provided by a set of activity experts;
   assigning, by the at least one AI model, at least one conditional priority to each of a human instructor and an AI instructor associated with the AI model, wherein the at least one conditional priority is assigned based on a plurality of priority rules;
   scheduling, by the at least one AI model, rendering of human feedback provided by the human instructor and AI feedback provided by the AI instructor to each of the plurality of users, based on the assigned at least one conditional priority and context determined for a current activity being performed each of the plurality of users;
   generating for each of the plurality of users, by the at least one AI model, feedback based on comparison of the set of user performance parameters with the set of target activity performance parameters, and wherein the feedback comprises at least one of visual feedback, aural feedback, or haptic feedback; and
   sharing with each of the plurality of users, by the at least one AI model, the feedback, wherein sharing the feedback comprises:
      rendering the feedback on a multimedia output device associated with the corresponding user; and
      sending the feedback to external portals via corresponding Application Programming Interfaces (APIs).

2. The method of claim 1, wherein the external portals comprise at least one of:
   social media platforms, display screens, projectors, or smart devices, wherein the display screens are viewed by one or more of the plurality of users, one or more instructors, or one or more observers.

3. The method of claim 1, wherein the feedback for a user may comprise at least one of: positive reinforcement, critical errors, dangerous errors, proposed corrective actions, corrective postures, ranks, awards, points, comparative performances with peers, comparison with previous performances of the user, or previous performances of groups.

4. The method of claim 3, further comprising selecting a set of peers for each of the plurality of users based on at least one selection criteria.

5. The method of claim 4, wherein the at least one selection criteria for selecting a set of peers for a user from the plurality of users comprises at least one of:
   location of the user and the set of peers;
   degree of relationship between the user and each of the set of peers derived from social medial platforms;
   age and gender associated with the user and the set of peers;
   gym, club, schools, and memberships associated with the user and the set of peers;
   Body Mass Index (BMI) associated with the user and the set of peers;
   fitness goals set by the user and the set of peers;
   performance of the set of peers;
   activity frequency and history of the set of peers;
   languages spoken.

6. The method of claim 4, further comprises:
   collating the feedback received for each of the plurality of users; and
   periodically generating a comparative analysis of performance of each of the plurality of users with at least one remaining plurality of users based on the collated feedback.

7. The method of claim 6, further comprising rendering the comparative analysis of performance of each of the plurality of users in comparison to the associated set of peers on a leader board.

8. The method of claim 1, wherein generating feedback for each of the plurality of users comprises grading, by the AI models, each of the plurality of users.

9. The method of claim 1, further comprising:
   generating a plurality of avatars for the plurality of users; and
   rendering a subset of avatars from the plurality of avatars performing the at least one activity contemporaneous to the corresponding plurality of users performing the at least one activity, wherein the subset of avatars may be rendered on at least one display screen being viewed by one or more of the plurality of users, human instructors, and observers.

10. The method of claim 1, wherein the plurality of priority rules comprises at least one of:
    disabling rendering of the AI feedback to each of the plurality of users during an ongoing rendering of the human feedback;
    simultaneously rendering to at least one of the plurality of users, the human feedback, and the AI feedback, when mode of rendering the human feedback and the AI feedback are non-overlapping and non-interfering; and
    assigning, for a given activity, higher priority to the human feedback, when an accuracy of the AI instructor for the given activity is below a predefined threshold, and wherein the AI instructor performs incremental learning based on the human feedback till the accuracy crosses the predefined threshold.

11. The method of claim 1, wherein the set of user performance parameters comprises speed of the current activity performance, number of repetitions completed, overall completion of an activity circuit, third-party smart device information, pulse rate of the user, blood pressure of the user, and motion of the user, and wherein the set of target activity performance parameters comprises speed of the target activity performance, target number of repetitions, target pulse rate of the user, and target motion of the user.

12. The method of claim 11, wherein the feedback provided to a user comprises disallowing an activity repetition not meeting at least one predefined threshold level, wherein the predefined threshold level corresponds to accuracy, endurance, and pace of the activity repetition.

13. The method of claim 1, further comprising generating a summarized and targeted feedback, by the at least one AI model, for each of the plurality of users.

14. A system for capturing and coordinating physical activities of multiple users, the system comprising:
   a processor; and
   a memory communicatively coupled to the processor, wherein the memory stores processor-executable instructions, which, on execution, causes the processor to:
      capture, via at least one multimedia input device, at least one activity performed by a plurality of users, wherein a first set of users from the plurality of users perform the at least one activity in distributed locations and a second set of users from the plurality of users perform the at least one activity in distributed locations;
      process in real-time, by at least one Artificial Intelligence (AI) model from a plurality of AI models, the captured at least one activity for each of the plurality of users to determine, for each of the plurality of users:
         a set of user performance parameters based on current activity performance, wherein the at least one AI model is configured based on target activity performance of an activity expert, a plurality of correct and incorrect movements, and tolerance metrics associated with the current activity, and wherein each of the plurality of AI models are trained and configured for a given activity;
      compare for each of the plurality of users, by the at least one AI model, the set of user performance parameters with a set of target activity performance parameters, wherein the set of target activity performance parameters is determined based on inputs provided by a set of activity experts;
      assign at least one conditional priority to each of a human instructor and an AI instructor associated with the AI model, wherein the at least one conditional priority is assigned based on a plurality of priority rules;
      schedule rendering of human feedback provided by the human instructor and AI feedback provided by the AI instructor to each of the plurality of users, based on the assigned at least one conditional priority and context determined for a current activity being performed each of the plurality of users;
      generate for each of the plurality of users, by the at least one AI model, feedback based on comparison of the set of user performance parameters with the set of target activity performance parameters, and wherein the feedback comprises at least one of visual feedback, aural feedback, or haptic feedback; and
      share with each of the plurality of users, by the at least one AI model, the feedback, wherein sharing the feedback comprises:
         render the feedback on a multimedia output device associated with the corresponding user; and send the feedback to external portals via corresponding Application Programming Interfaces (APIs).

15. The system of claim 14, wherein the external portals comprise at least one of: social media platforms, display screens, projectors, or smart devices, wherein the display screens are viewed by one or more of the plurality of users, one or more instructors, or one or more observers.

16. The system of claim 14, wherein the feedback for a user comprises at least one of: positive reinforcement, proposed corrective actions and postures, ranks, awards, points, comparative performance with peers, comparison with previous performances of the user, or previous performances of groups.

17. The system of claim 14, wherein generating feedback for each of the plurality of users comprises grading, by the AI models, each of the plurality of users.

18. A computer program product being embodied in a non-transitory computer readable storage medium of a computing device and comprising computer instructions for capturing and coordinating physical activities of multiple users, the method comprising:

capturing, via at least one multimedia input device, at least one activity performed by a plurality of users, wherein a first set of users from the plurality of users perform the at least one activity in distributed locations and a second set of users from the plurality of users perform the at least one activity in distributed locations;

processing in real-time, by at least one Artificial Intelligence (AI) model from a plurality of AI models, the captured at least one activity for each of the plurality of users to determine, for each of the plurality of users:

a set of user performance parameters based on current activity performance, wherein the at least one AI model is configured based on target activity performance of an activity expert, a plurality of correct and incorrect movements, and tolerance metrics associated with the current activity, and wherein each of the plurality of AI models are trained and configured for a given activity;

comparing for each of the plurality of users, by the at least one AI model, the set of user performance parameters with a set of target activity performance parameters, wherein the set of target activity performance parameters is determined based on inputs provided by a set of activity experts;

assigning, by the at least one AI model, at least one conditional priority to each of a human instructor and an AI instructor associated with the AI model, wherein the at least one conditional priority is assigned based on a plurality of priority rules;

scheduling, by the at least one AI model, rendering of human feedback provided by the human instructor and AI feedback provided by the AI instructor to each of the plurality of users, based on the assigned at least one conditional priority and context determined for a current activity being performed each of the plurality of users;

generating for each of the plurality of users, by the at least one AI model, feedback based on comparison of the set of user performance parameters with the set of target activity performance parameters, and wherein the feedback comprises at least one of visual feedback, aural feedback, or haptic feedback; and sharing with each of the plurality of users, by the at least one AI model, the feedback, wherein sharing the feedback comprises:

rendering the feedback on a multimedia output device associated with the corresponding user; and sending the feedback to external portals via corresponding Application Programming Interfaces (APIs).

\* \* \* \* \*